(12) United States Patent
Torikai

(10) Patent No.: US 10,630,894 B2
(45) Date of Patent: Apr. 21, 2020

(54) NOTIFICATION SYSTEM, WEARABLE DEVICE, INFORMATION PROCESSING APPARATUS, CONTROL METHOD THEREOF, AND COMPUTER-READABLE STORAGE MEDIUM

(71) Applicant: CANON KABUSHIKI KAISHA, Tokyo (JP)

(72) Inventor: Hiroyuki Torikai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 15/605,386

(22) Filed: May 25, 2017

(65) Prior Publication Data

US 2017/0353655 A1  Dec. 7, 2017

(30) Foreign Application Priority Data

Jun. 1, 2016 (JP) ................................. 2016-110260

(51) Int. Cl.
*H04N 5/232* (2006.01)
*G08B 21/18* (2006.01)
(52) U.S. Cl.
CPC ......... *H04N 5/23222* (2013.01); *G08B 21/18* (2013.01); *H04N 5/23206* (2013.01)
(58) Field of Classification Search
None
See application file for complete search history.

(56) References Cited

U.S. PATENT DOCUMENTS

| 2009/0160970 A1* | 6/2009 | Fredlund ............... H04N 5/232 348/229.1 |
| 2009/0162042 A1* | 6/2009 | Wexler ............... H04N 5/23222 396/49 |
| 2010/0009700 A1* | 1/2010 | Camp, Jr. ......... H04M 1/72572 455/456.6 |
| 2011/0050909 A1* | 3/2011 | Ellenby .................. G03B 17/24 348/207.1 |

(Continued)

FOREIGN PATENT DOCUMENTS

JP   2011-95867   5/2011

*Primary Examiner* — Twyler L Haskins
*Assistant Examiner* — Wesley J Chiu
(74) *Attorney, Agent, or Firm* — Venable LLP

(57) ABSTRACT

A notification system includes: a wearable device; an information processing apparatus connectable to the wearable device; and an imaging apparatus connectable to the information processing apparatus. The information processing apparatus includes a first connection unit configured to connect to the wearable device, a second connection unit configured to connect to the imaging apparatus, an acquisition unit configured to acquire position information on a current position, and a transmitting unit configured to transmit a notification request to notify a subject associated with the acquired position information to the wearable device when the information processing apparatus is connected to the imaging apparatus. The wearable device includes a third connection unit configured to connect to the information processing apparatus, a receiving unit configured to receive the notification request from the information processing apparatus, and a notification unit configured to provide notification about the subject according to the received notification request.

21 Claims, 14 Drawing Sheets

(56) References Cited

U.S. PATENT DOCUMENTS

| | | | |
|---|---|---|---|
| 2011/0069183 A1* | 3/2011 | Edwards | H04M 1/72572 348/207.1 |
| 2012/0109955 A1* | 5/2012 | Lahcanski | G06K 9/00664 707/737 |
| 2013/0050507 A1* | 2/2013 | Syed | H04N 1/00137 348/207.1 |
| 2014/0112326 A1* | 4/2014 | Torikai | H04W 76/10 370/338 |
| 2014/0247325 A1* | 9/2014 | Wu | H04N 5/23206 348/39 |
| 2014/0248911 A1* | 9/2014 | Rouda, Jr. | H04W 4/029 455/456.3 |
| 2015/0156460 A1* | 6/2015 | Szybalski | G06K 9/00476 348/143 |
| 2016/0327915 A1* | 11/2016 | Katzer | G04B 19/04 |

* cited by examiner

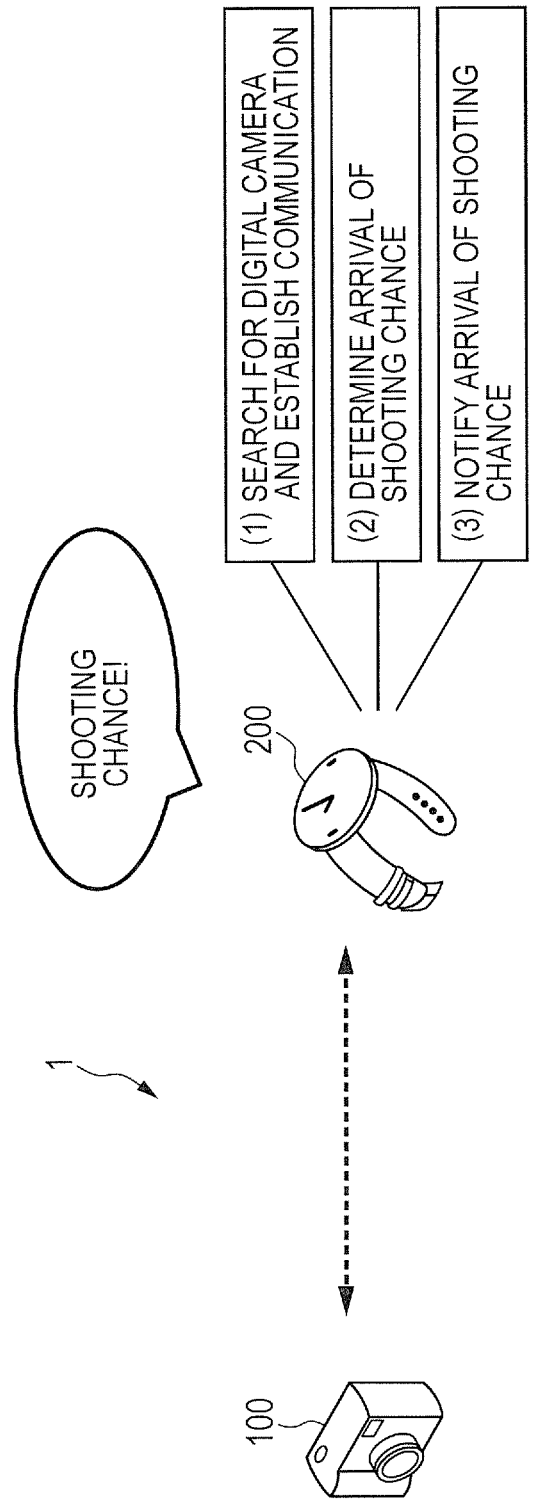

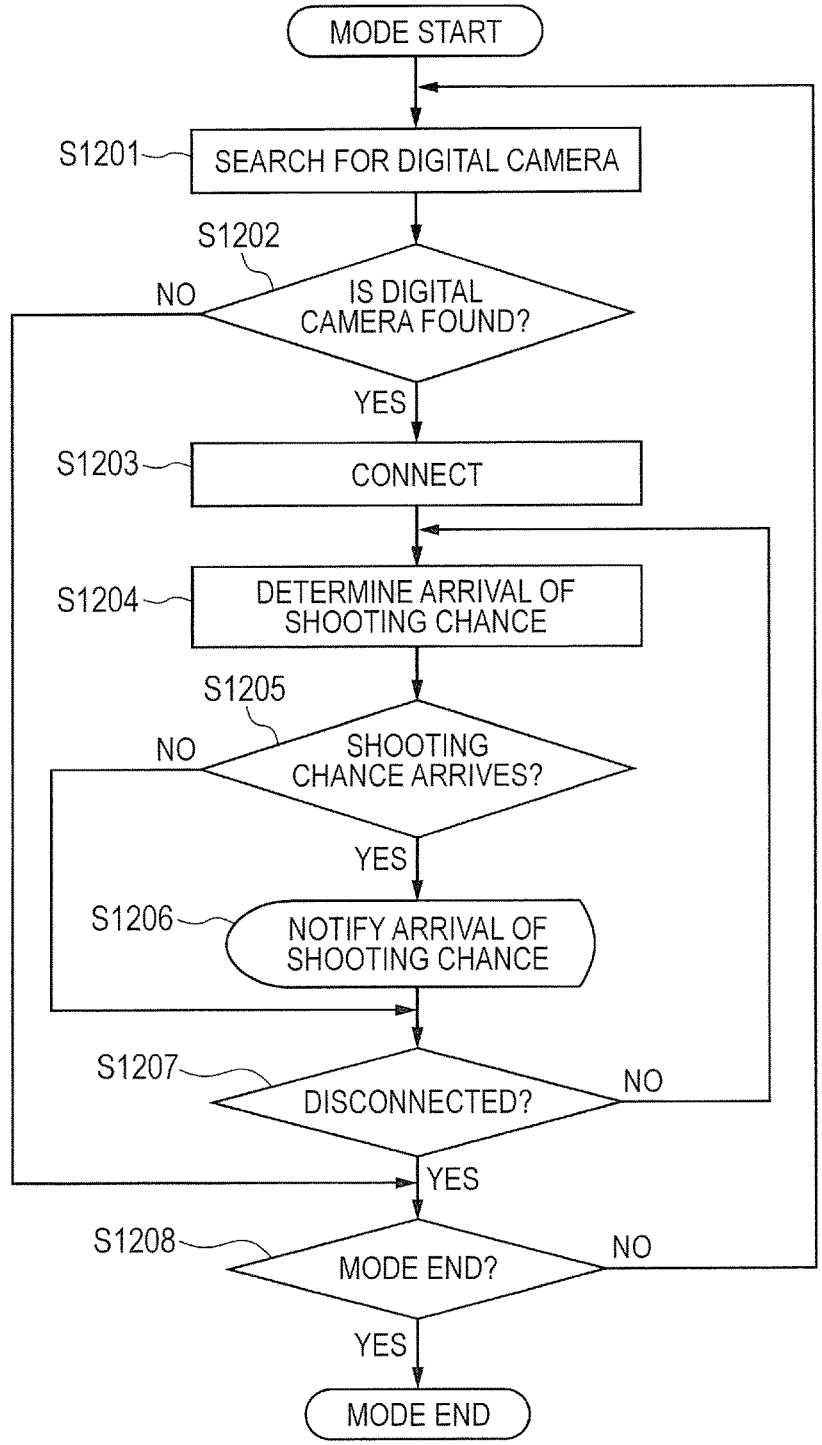

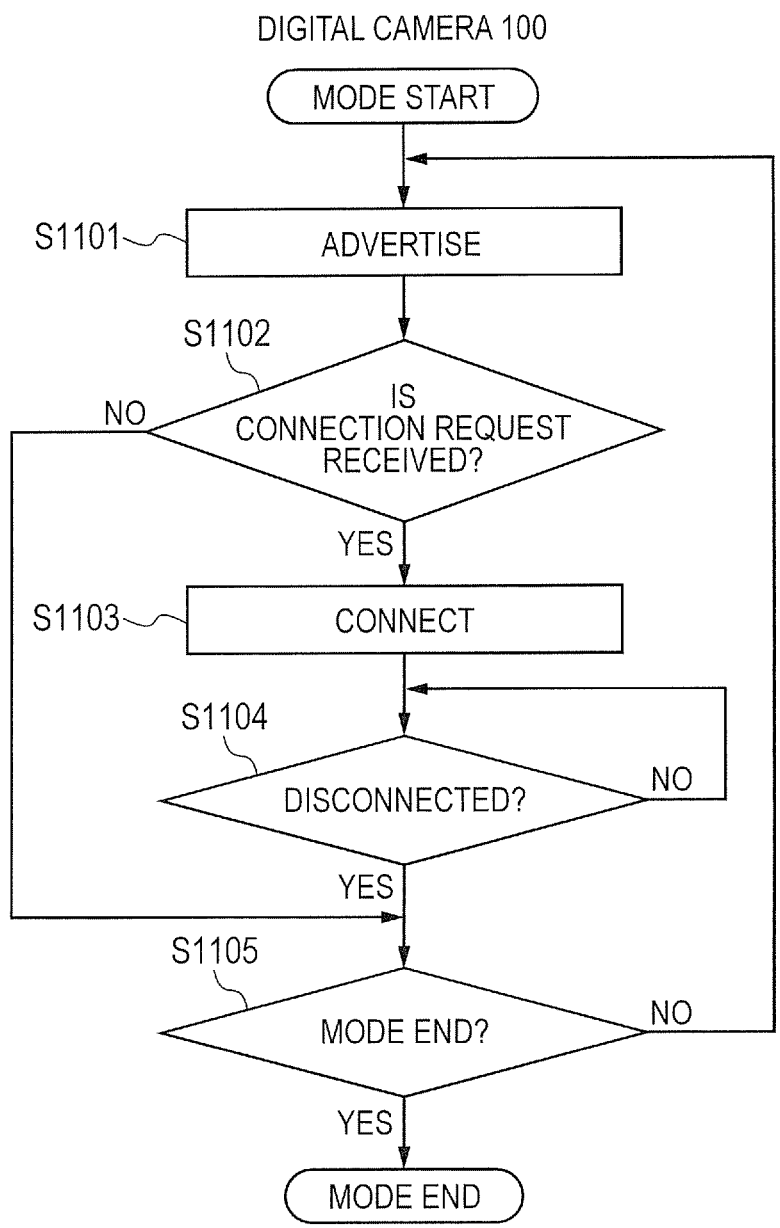

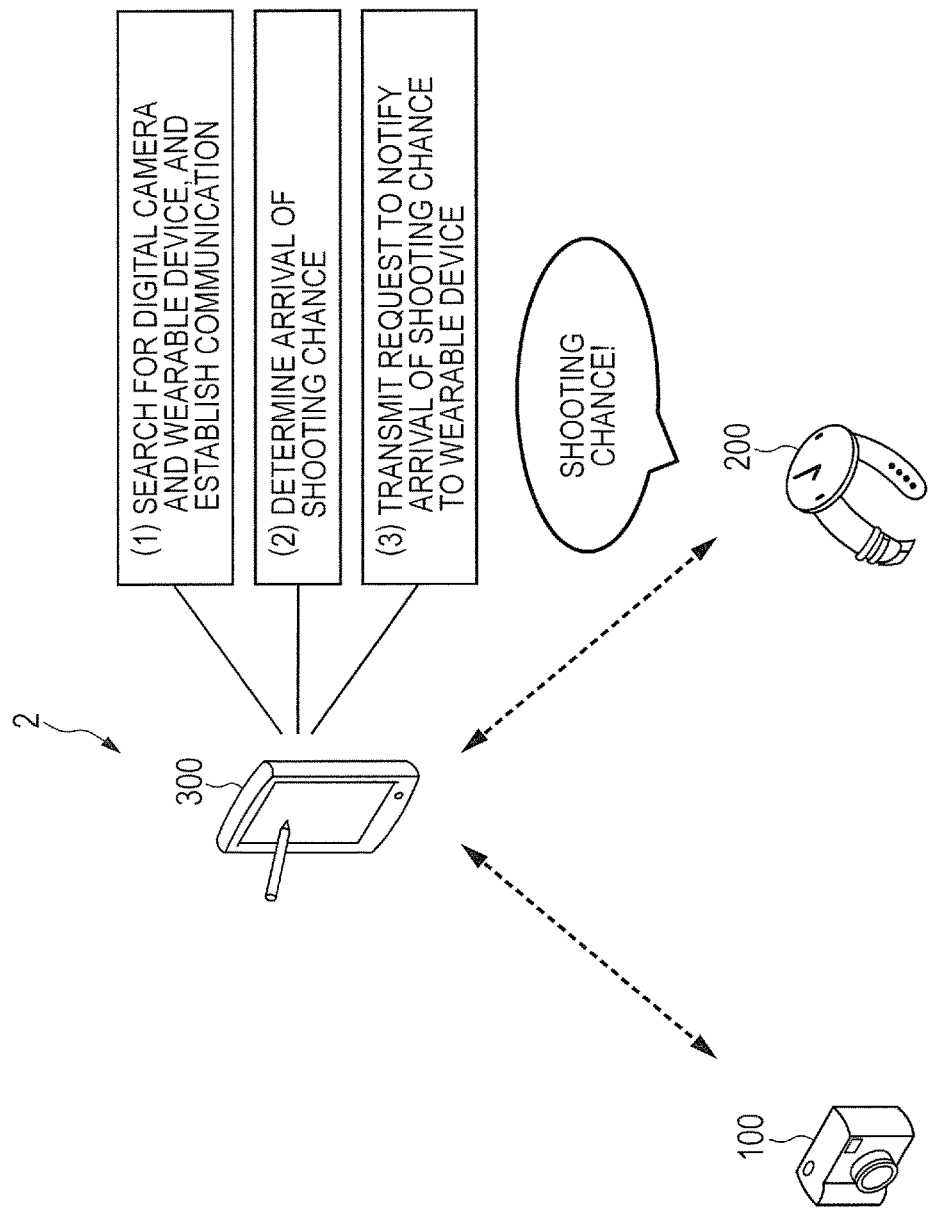

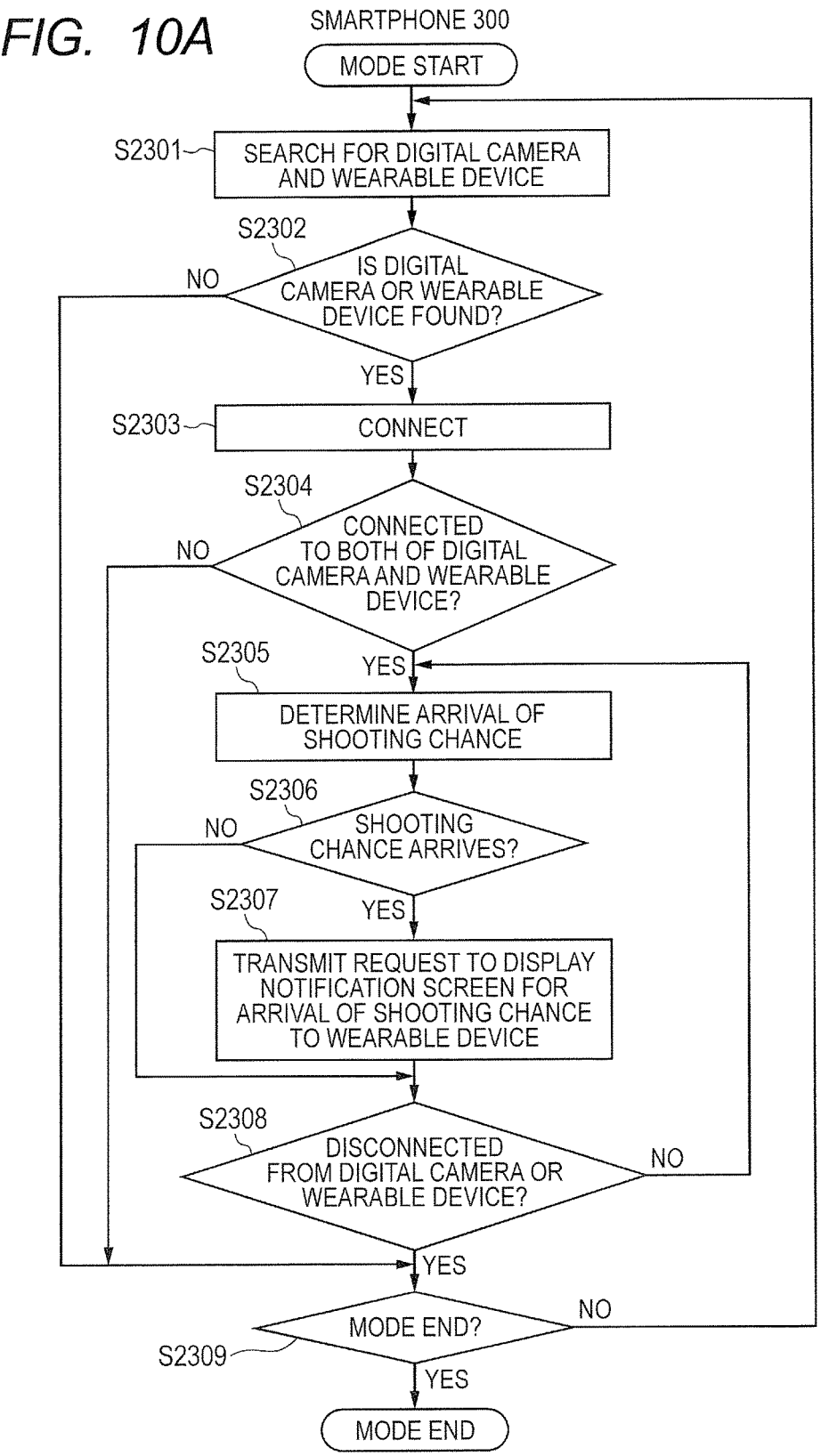

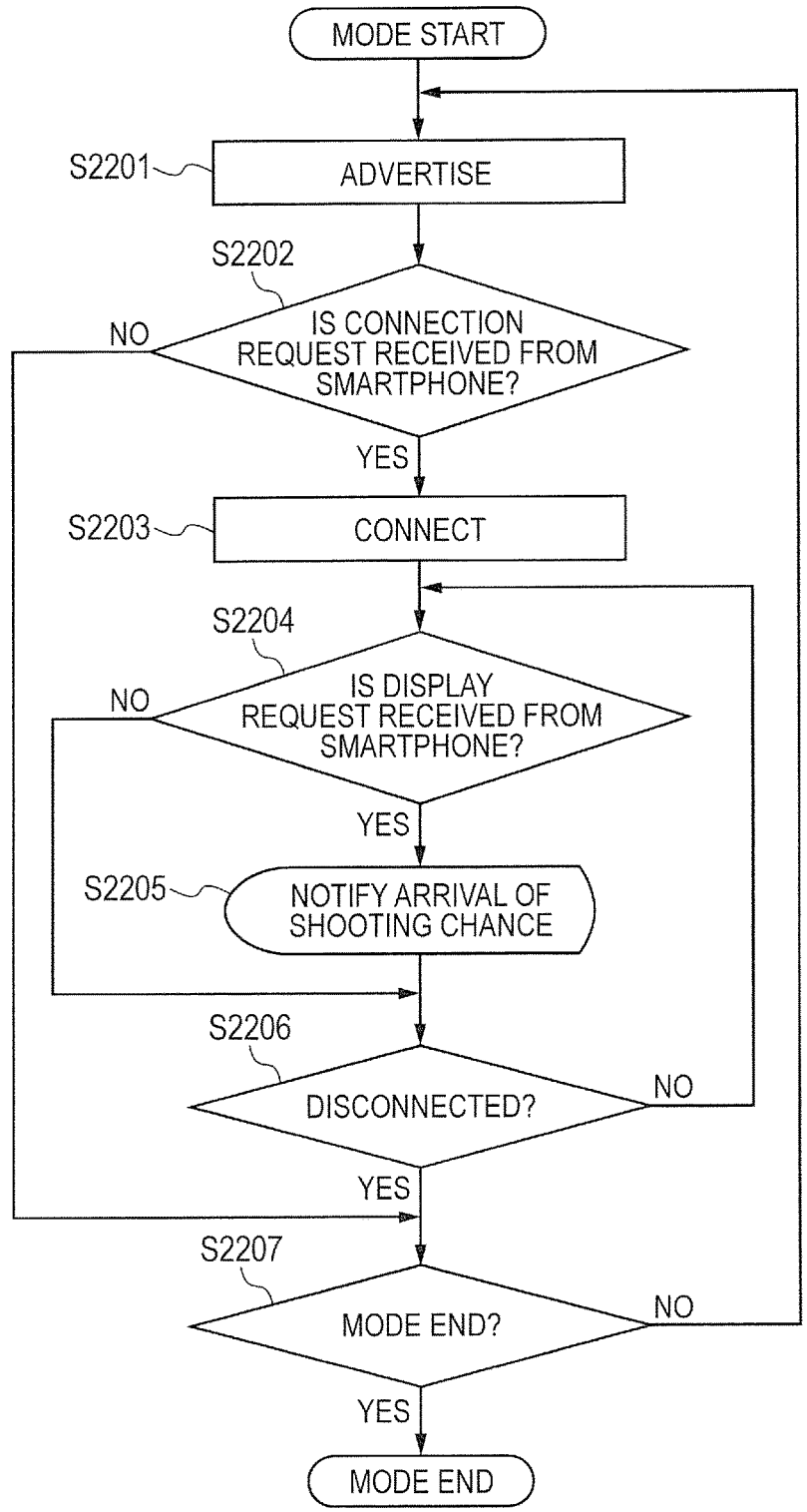

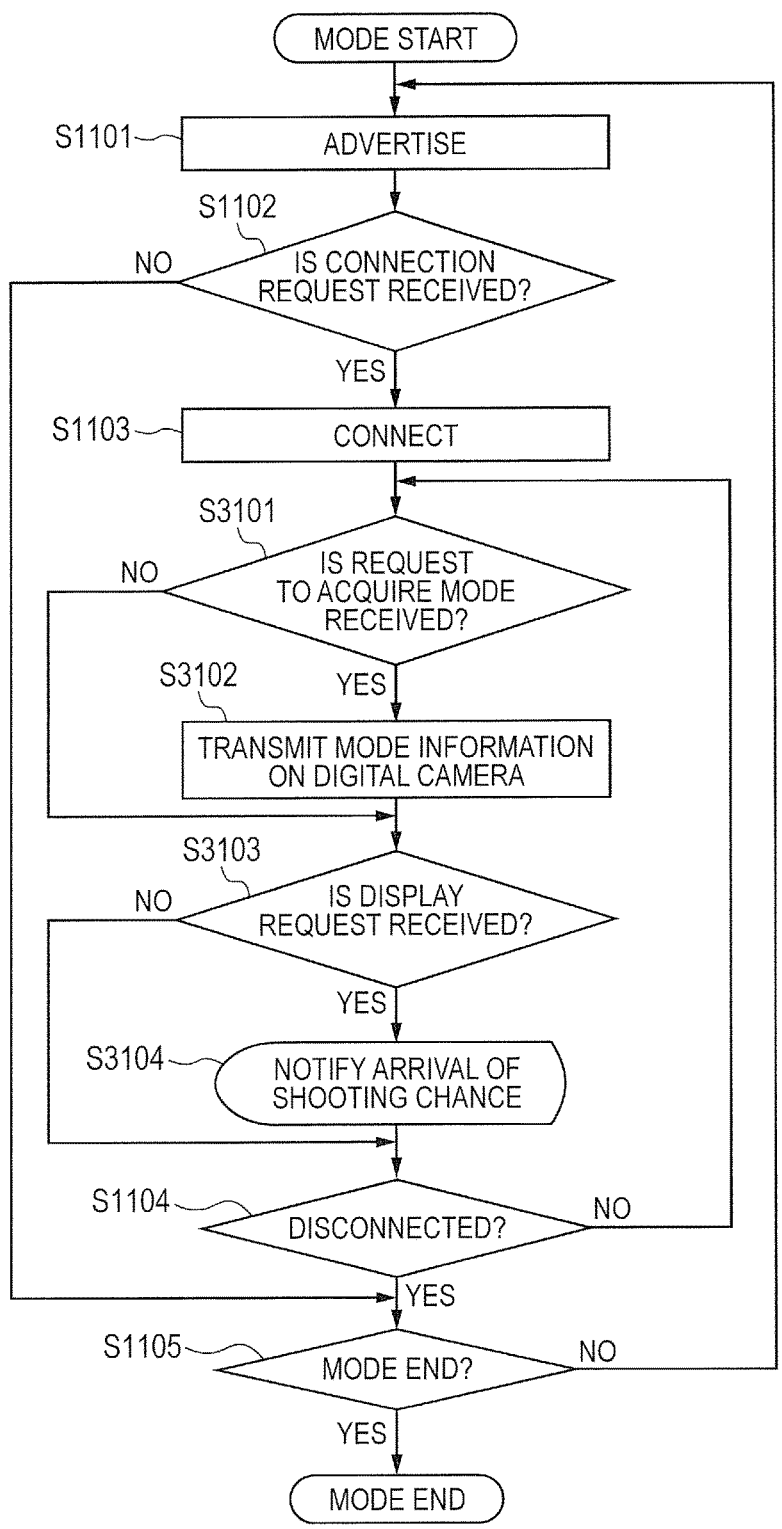

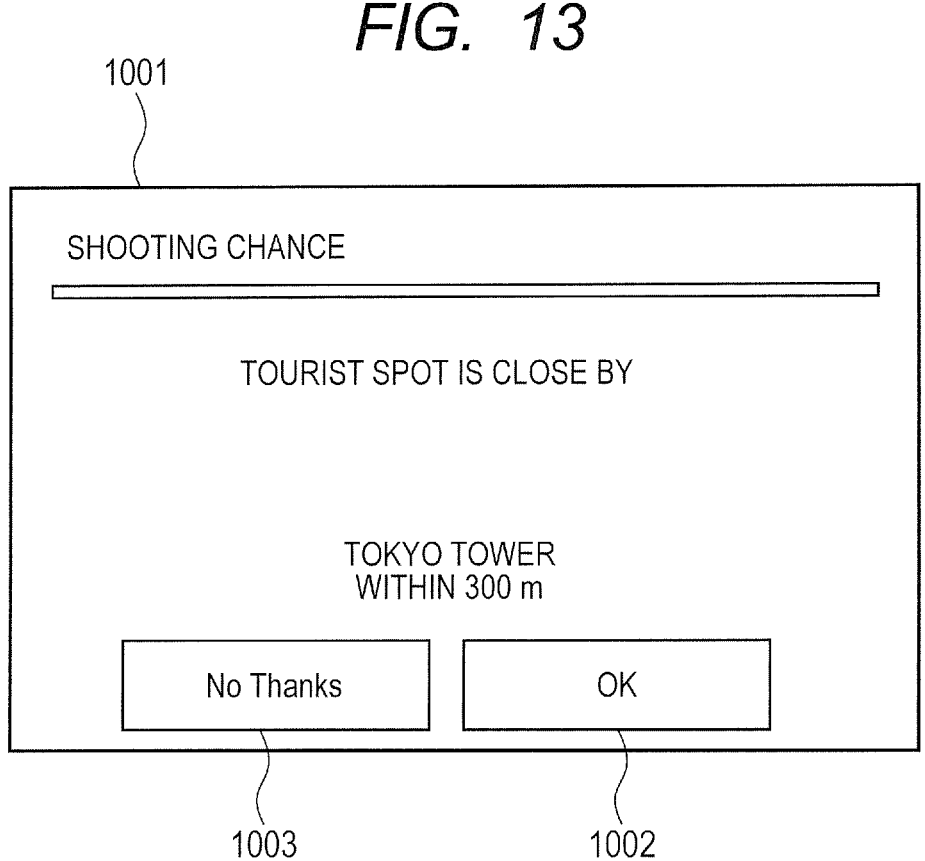

NOTIFICATION SYSTEM, WEARABLE DEVICE, INFORMATION PROCESSING APPARATUS, CONTROL METHOD THEREOF, AND COMPUTER-READABLE STORAGE MEDIUM

BACKGROUND OF THE INVENTION

Field of the Invention

The present invention relates to a notification system, a wearable device, an information processing apparatus, a control method thereof, and a computer-readable storage medium.

Description of the Related Art

Camera users sometimes visit unfamiliar places on a trip and the like.

On such an occasion, if the users do not have enough sightseeing information about their travel destinations, they might miss their chances to go to beauty spots even when visiting a tourist site, or pass by a famous building without taking pictures thereof. In such a case, the users end up missing their opportunities to take pictures.

To address this situation, there has been proposed a technique of detecting each of subjects photographed by many people, calculating a range within which the subject can be seen, accumulating the calculated ranges as tourist spots, and thus delivering an appropriate tourist spot to a terminal of a user (see Japanese Patent Application Laid-Open No. 2011-095867).

However, in the technique described in Japanese Patent Application Laid-Open No. 2011-095867, information on the tourist spots is delivered to the terminal of the user if the user enters a search query. In other words, the user cannot obtain such information unless he/she operates the terminal. Thus, in the technique described in Japanese Patent Application Laid-Open No. 2011-095867, the user cannot obtain the information on the tourist spots until the user operates the terminal. Therefore, the user may often miss the opportunity to take pictures even though the user carries a camera. For example, in a case where the user carries the terminal in a bag while walking around in a town, the user cannot notice the arrival of such shooting chances.

SUMMARY OF THE INVENTION

It is an object of the present invention to provide a technique capable of reducing or preventing the missing of shooting chances for a user carrying an imaging apparatus.

One aspect of the present invention provides a notification system including: a wearable device; an information processing apparatus connectable to the wearable device; and an imaging apparatus connectable to the information processing apparatus, wherein the information processing apparatus includes a first connection unit configured to connect to the wearable device, a second connection unit configured to connect to the imaging apparatus, an acquisition unit configured to acquire position information on a current position, and a transmitting unit configured to transmit a notification request to notify a subject associated with the acquired position information to the wearable device when the information processing apparatus is connected to the imaging apparatus, and the wearable device includes a third connection unit configured to connect to the information processing apparatus, a receiving unit configured to receive the notification request from the information processing apparatus, and a notification unit configured to provide notification about the subject according to the received notification request.

Another aspect of the present invention provides a wearable device including: a connection unit configured to connect to an information processing apparatus including an imaging unit through wireless communication; a receiving unit configured to receive a notification request to notify a subject associated with position information acquired by the information processing apparatus, from the information processing apparatus; and a notification unit configured to provide notification about the subject according to the received notification request.

Further another aspect of the present invention provides an information processing apparatus including: an imaging unit; a connection unit configured to connect to a wearable device through wireless communication; an acquisition unit configured to acquire position information on a current position; and a transmitting unit configured to transmit a notification request to notify a subject associated with the acquired position information to the wearable device.

Further another aspect of the present invention provides a method of controlling a wearable device, including the steps of: connecting to an information processing apparatus including an imaging unit through wireless communication; receiving a notification request to notify a subject associated with position information acquired by the information processing apparatus, from the information processing apparatus; and providing notification of the subject according to the received notification request.

Further another aspect of the present invention provides a method of controlling an information processing apparatus including an imaging unit, including the steps of: connecting to a wearable device through wireless communication; acquiring position information on a current position; and transmitting a notification request to notify a subject associated with the acquired position information to the wearable device.

The present invention can reduce or prevent the missing of shooting chances for a user carrying an imaging apparatus.

Further features of the present invention will become apparent from the following description of exemplary embodiments with reference to the attached drawings.

BRIEF DESCRIPTION OF THE DRAWINGS

FIG. 4 is a schematic diagram showing an operation of notifying a user of the arrival of a shooting chance in the notification system according to the first embodiment of the present invention.

FIG. 5A is a flowchart showing operations of the wearable device according to the first embodiment of the present invention.

FIG. 5B is a flowchart showing operations of the digital camera according to the first embodiment of the present invention.

FIG. 9 is a schematic diagram showing an operation of notifying a user of the arrival of a shooting chance in the notification system according to the second embodiment of the present invention.

FIG. 10A is a flowchart showing operations of the smartphone according to the second embodiment of the present invention.

FIG. 10B is a flowchart showing operations of a wearable device according to the second embodiment of the present invention.

FIG. 12B is a flowchart showing operations of a digital camera according to the third embodiment of the present invention.

FIG. 13 is a schematic diagram showing an example of a notification screen for the arrival of a shooting chance displayed on a display unit in the digital camera according to the third embodiment of the present invention.

DESCRIPTION OF THE EMBODIMENTS

Preferred embodiments of the present invention will now be described in detail in accordance with the accompanying drawings. Note that the embodiments described below are examples as means for realizing the present invention and may be accordingly modified or changed depending on configurations of devices to which the present invention is applied and various conditions. Moreover, the respective embodiments may also be accordingly combined.

First Embodiment

With reference to FIGS. 1 to 6, description is given of a notification system, a wearable device, an imaging apparatus, and a control method thereof according to a first embodiment of the present invention.

Figure 1:
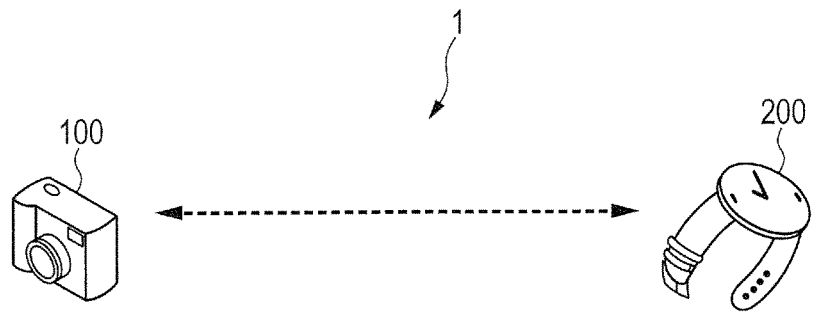
FIG. 1 is a schematic diagram showing an overall configuration of a notification system according to a first embodiment of the present invention.

First, with reference to FIG. 1, description is given of an overall configuration of the notification system according to this embodiment. FIG. 1 is a schematic diagram showing the overall configuration of the notification system according to this embodiment.

The notification system according to this embodiment notifies a user of a digital camera that is the imaging apparatus of the arrival of a shooting chance with the digital camera.

As shown in FIG. 1, a notification system 1 according to this embodiment includes a digital camera 100 used by the user for shooting and a wearable device 200 that determines the arrival of a shooting chance and notifies the user of the arrival of the shooting chance. The digital camera 100 and the wearable device 200 are configured to be able to wirelessly communicate with each other. Hereinafter, configurations of the digital camera 100 and the wearable device 200 are described in detail, respectively.

<Configuration of Digital Camera>

Figure 2:
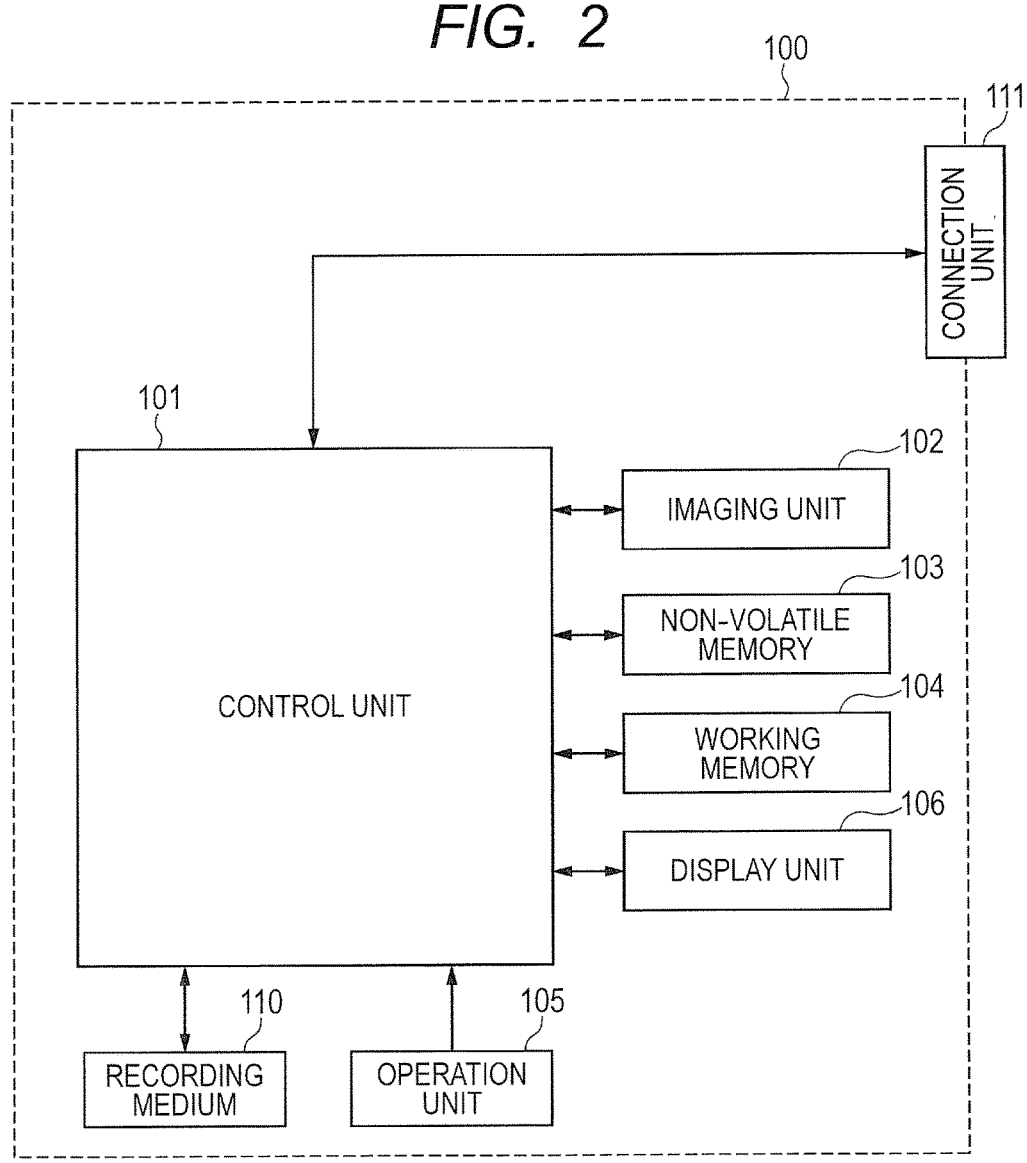
FIG. 2 is a block diagram showing a configuration of a digital camera according to the first embodiment of the present invention.

First, with reference to FIG. 2, description is given of the configuration of the digital camera 100 in the notification system 1 according to this embodiment. FIG. 2 is a block diagram showing a configuration example of the digital camera 100 as an example of the imaging apparatus in the notification system 1 according to this embodiment. Note that the digital camera 100 may be a digital still camera capable of shooting still images or a digital video camera capable of shooting videos, or may have functions of the both cameras. Also, although the digital camera is described as an example of the imaging apparatus in this embodiment, the imaging apparatus is not limited thereto. The imaging apparatus may be an information processing apparatus having an image shooting function and a communication function, such as a portable media player, a so-called tablet device, and a personal computer, each having a camera function and a communication function. The imaging apparatus may be one capable of shooting at least one of still images and videos.

As shown in FIG. 2, the digital camera 100 includes a control unit 101, an imaging unit 102, a non-volatile memory 103, and a working memory 104. The digital camera 100 further includes an operation unit 105, a display unit 106, a recording medium 110, and a connection unit 111.

The control unit 101 controls the respective units in the digital camera 100 according to inputted signals or programs to be described later. Note that, instead of the control unit 101 controlling the entire device, multiple pieces of hardware may control the entire device by sharing processing.

The imaging unit 102 includes a lens, an image sensor, and a signal processor. The image sensor converts subject light focused by the lens into an electric signal. The imaging unit 102 uses the signal processor to perform noise reduction processing and the like of the electric signal converted by the image sensor, and outputs digital data as image data. The image data obtained by the imaging unit 102 is stored in a buffer memory, subjected to predetermined arithmetic processing by the control unit 101, and then recorded in the recording medium 110.

The non-volatile memory 103 is an electrically erasable and recordable non-volatile memory, and stores programs and the like to be described later, which are executed by the control unit 101.

The working memory 104 is used as the buffer memory that temporarily holds the image data obtained by the imaging unit 102, an image display memory for the display unit 106, a work area for the control unit 101, and the like.

The operation unit 105 is used to receive instructions on the digital camera 100 from the user. The operation unit 105 includes, for example, operation members such as a power button for the user to instruct power on and off of the digital camera 100, a release switch for instructing shooting, and a play button for instructing the playback of the image data. Moreover, a touch panel formed in the display unit 106 to be described later is also included in the operation unit 105. Note that the release switch includes SW1 and SW2. When the release switch is set in a so-called half press state, SW1 is turned ON. Thus, instructions for shooting preparations are received, such as AF (autofocus) processing, AE (automatic exposure) processing, AWB (automatic white balance), and EF (electronic flash pre-emission) processing. On the other hand, when the release switch is set in a full press state, SW2 is turned ON. Thus, instructions for shooting are received.

The display unit 106 displays a viewfinder image during shooting, shot image data, characters for dialogic operations, and the like. Note that the display unit 106 does not always have to be included in the digital camera 100. The digital camera 100 need only be connected to an internal or external display unit 106, and at least have a display control function to control the display on the display unit 106. The display unit 106 can be configured using a touch panel, for example, and can include some of or all of the functions of the operation unit 105.

The recording medium 110 can record the image data outputted from the imaging unit 102. The recording medium 110 may be configured detachably with respect to the digital camera 100 or may be included in the digital camera 100. More specifically, the digital camera 100 may have at least means for accessing the recording medium 110.

The connection unit 111 is an interface for connecting to an external device. The digital camera 100 according to this embodiment can be connected to the external device such as the wearable device 200 through the connection unit 111 to exchange data with the connected external device. In this embodiment, the connection unit 111 includes an antenna, and the control unit 101 can be wirelessly connected to the external device such as the wearable device 200 through the connection unit 111 including the antenna. Note that, as for the connection with the external device such as the wearable device 200, the digital camera 100 may be directly connected thereto or may communicate therewith through a relay server.

For example, the connection unit 111 is a Bluetooth (registered trademark) module, and can use a unique profile through Bluetooth as a protocol for communicating data. Note that the communication with the external device such as the wearable device 200 is not limited thereto. For example, the connection unit 111 is a communication module for near field communication, and can include a wireless communication module such as an infrared communication module and a wireless LAN (Local Area Network) communication module. The connection unit 111 can also include a wireless communication module such as a wireless USB (Universal Serial Bus) module. Furthermore, wired connection may be adopted for the connection unit 111, such as a USB cable, an HDMI (registered trademark) (High-Definition Multimedia Interface), and IEEE1394.

The digital camera 100 can be communicably connected to the wearable device 200 through the connection unit 111 as described later. Also, the digital camera 100 to be connected to the wearable device 200 can be registered with the wearable device 200 by previously pairing with the wearable device 200.

The description thus far is of the digital camera 100.

<Configuration of Wearable Device>

Figure 3:
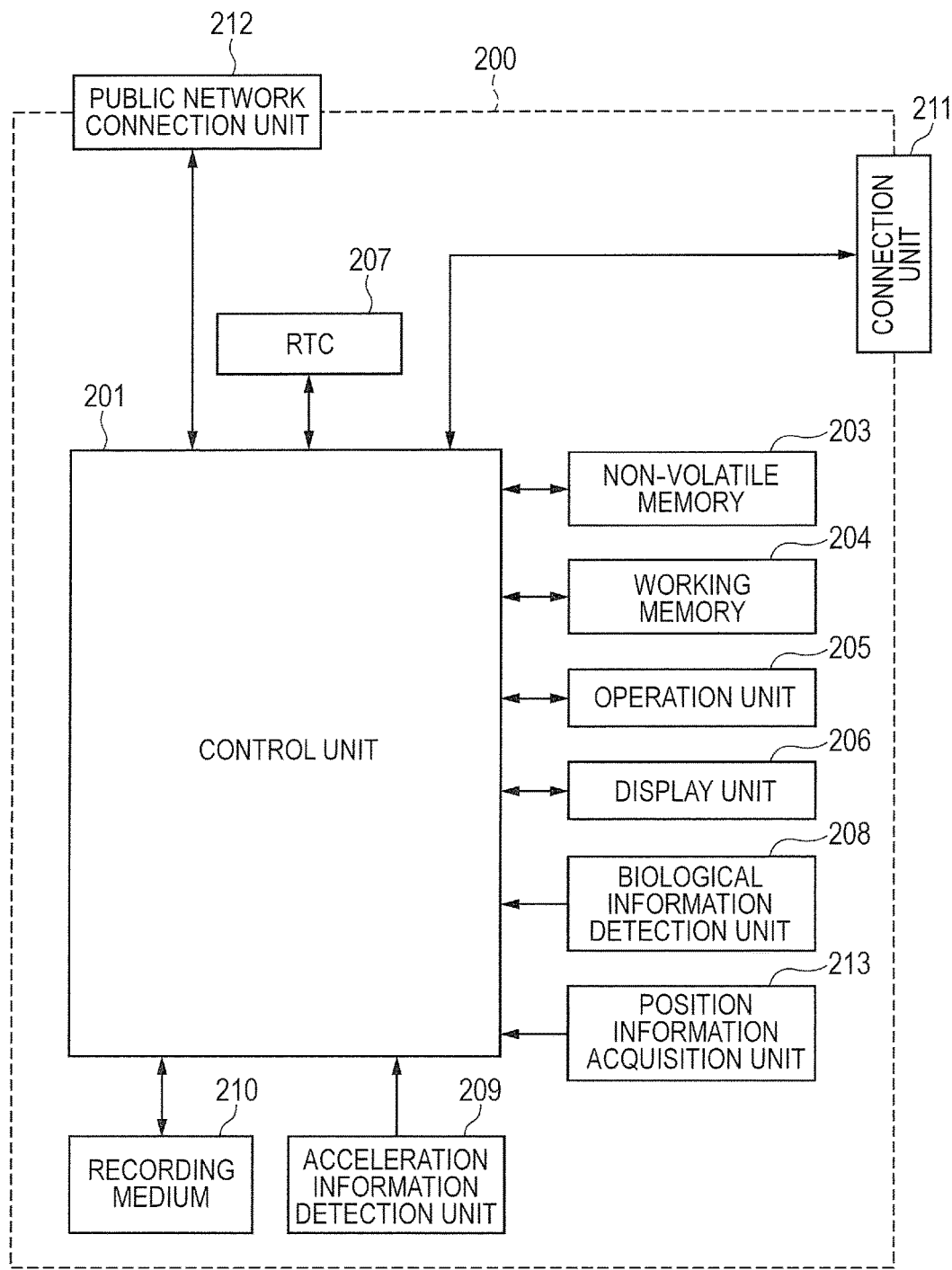
FIG. 3 is a block diagram showing a configuration of a wearable device according to the first embodiment of the present invention.

Next, with reference to FIG. 3, description is given of the wearable device 200 in the notification system 1 according to this embodiment. FIG. 3 is a block diagram showing a configuration example of the wearable device 200 that is an example of the information processing apparatus in the notification system 1 according to this embodiment. Note that, in this embodiment, description is given of a wearable device assumed to be a wristwatch called a smartwatch with a wireless communication function, as an example of a wearable information processing apparatus mounted on the body of the user of the digital camera 100. However, the wearable device is not limited thereto. For example, the wearable device may be eyeglasses with a wireless communication function, a thermometer or body composition meter with a wireless communication function, a helmet with a wireless communication function, or the like.

As shown in FIG. 3, the wearable device 200 includes a control unit 201, a non-volatile memory 203, and a working memory 204. The wearable device 200 also includes an operation unit 205, a display unit 206, an RTC (Real Time Clock) 207, a biological information detection unit 208, an acceleration information detection unit 209, a recording medium 210, and a connection unit 211. The wearable device 200 further includes a public network connection unit 212 and a position information acquisition unit 213.

The control unit 201 controls inputted signals and the respective units in the wearable device 200 according to programs to be described later. Note that, instead of the control unit 201 controlling the entire device, multiple pieces of hardware may control the entire device by sharing processing.

The non-volatile memory 203 is an electrically erasable and recordable non-volatile memory. The non-volatile memory 203 records an OS (operating system) that is basic software executed by the control unit 201 and applications to realize applicative functions in cooperation with the OS. In this embodiment, the non-volatile memory 203 also stores an application for communicating with the digital camera 100.

The working memory 204 is used as an image display memory for the display unit 206, a work area for the control unit 201, and the like.

The operation unit 205 is used to receive instructions on the wearable device 200 from the user. The operation unit 205 includes, for example, operation members such as a power button for the user to instruct power on and off of the wearable device 200, an operation member for setting the RTC 207, and a touch panel formed in the display unit 206.

The display unit 206 displays image data, characters for dialogic operations, and the like. Note that the display unit 206 does not always have to be included in the wearable device 200. The wearable device 200 need only be connected to the display unit 206 and at least have a display control function to control the display on the display unit 206. The display unit 206 can be configured using a touch panel, for example, and can include some of or all of the functions of the operation unit 205.

The RTC 207 performs time of day control. Note that the RTC 207 can adopt any method as long as the time of day control can be performed. For example, the RTC 207 may perform the time of day control based on the time setting made by the user through the operation unit 205. Alternatively, the RTC 207 may perform the time of day control, for example, by acquiring time information through the connection unit 211 for the time setting. Still alternatively, the RTC 207 may perform the time of day control, for example, based on clock setting acquired by a radio clock. Moreover, the RTC 207 may be configured to be able to acquire time information by using a detection mechanism to detect the time information from a mechanical mechanism such as an analog clock. In this case, it is assumed that the RTC 207 includes the detection mechanism to detect the time information from the analog clock.

The biological information detection unit 208 is a sensor to detect biological information on the user wearing the wearable device 200 on his/her body. The biological information detection unit 208 need only detect the biological information and also detect that the biological information can no longer be detected. The biological information detection unit 208 includes, for example, a sensor to detect a pulse, a sensor to detect a heart rate, a sensor to detect a blood flow, and a sensor to detect a change in potential by a conductive polymer coming in contact with the skin.

The acceleration information detection unit 209 is a sensor to detect a change in acceleration. The acceleration information detection unit 209 need only detect if there is acceleration. The acceleration information detection unit 209 can determine whether or not the user is on the move wearing the wearable device 200 on his/her body, based on information about such a change in acceleration or the presence or absence of acceleration.

The recording medium 210 can record image data transmitted from the digital camera 100 and transferred to the control unit 201 through the connection unit 211, for example. The recording medium 210 can also record information other than the image data, for example, the biological information detected by the biological information detection unit 208. The recording medium 210 may be detachably configured to the wearable device 200 or may be included in the wearable device 200. More specifically, the wearable device 200 may have at least means for accessing the recording medium 210.

The connection unit 211 is an interface for connecting to an external device. The wearable device 200 according to this embodiment can be connected to the external device such as the digital camera 100 through the connection unit 211 to exchange data with the connected external device. In this embodiment, the connection unit 211 includes an antenna, and the control unit 201 can be wirelessly connected to the external device such as the digital camera 100 through the connection unit 211 including the antenna. Note that, as for the connection with the external device such as the digital camera 100, the wearable device 200 may be directly connected thereto or may communicate therewith through a relay server.

For example, the connection unit 211 is a Bluetooth module, and can use a unique profile through Bluetooth as a protocol for communicating data. Note that the communication with the external device such as the digital camera 100 is not limited thereto. For example, the connection unit 211 is a communication module for near field communication, and can include a wireless communication module such as an infrared communication module, a wireless LAN communication module, and a wireless USB. Furthermore, wired connection may be adopted for the connection unit 211, such as a USB cable, an HDMI, and IEEE1394.

The public network connection unit 212 is an interface for use in public wireless communication. The wearable device 200 can access a network such as the Internet by performing data communication through the public network connection unit 212. Thus, the control unit 201 can acquire information about tourist spots and famous places from the network. It is assumed, in this embodiment, that the public network connection unit 212 includes an interface for communication using 3G. Note that not only 3G but also other communication methods may be used, such as LTE (Long Term Evolution) and WiMAX (Worldwide Interoperability for Microwave Access). Alternatively, other communication methods may also be used, such as ADSL (Asymmetric Digital Subscriber Line), FTTH (Fiber To The Home), and so-called 4G. Moreover, the connection unit 211 and the public network connection unit 212 do not always have to be configured using two independent pieces of hardware, but can also be realized by using one antenna, for example.

The position information acquisition unit 213 acquires position information on a current position of the wearable device 200. The current position of the wearable device 200 corresponds to the current position of the user wearing the wearable device 200. The position information acquisition unit 213 is, for example, a GPS (Global Positioning System) module, and acquires the position information on the current position of the wearable device 200 by receiving radio waves from a GPS satellite for positioning. Note that the method used by the position information acquisition unit 213 to acquire the position information is not limited thereto. The position information acquisition unit 213 can also acquire the position information on the current position of the wearable device 200 by using position information on a base station used by the wearable device 200 for communication or position information on a wireless LAN access point, for example, besides the positioning by the GPS.

The description thus far is of the wearable device 200.

<Use Case 1>

With reference to FIG. 4, description is given of an example of a use case of the notification system 1 according to this embodiment. FIG. 4 is a schematic diagram showing an operation of notifying the user of the arrival of a shooting chance in the notification system 1 according to this embodiment including the digital camera 100 and the wearable device 200.

The wearable device 200 can determine the arrival of a shooting chance for shooting with the digital camera 100.

For example, a user who takes pictures of every meal, i.e., breakfast, lunch, and dinner, with the digital camera 100 presets the time of each of the meals, breakfast, lunch, and dinner, in the wearable device 200. In this case, when the time of the meal preset by the user arrives, the wearable device 200 determines that a shooting chance arrives. Alternatively, the user presets, for example, the times of events, based on an itinerary or the like, in the wearable device 200. In this case, the wearable device 200 determines that a shooting chance arrives upon every arrival of the time of the event. Moreover, the user presets regular time intervals for setting a shooting pace, for example, in the wearable device 200. In this case, the wearable device 200 determines that a shooting chance arrives upon every arrival of the time when the time interval preset by the user has elapsed.

In another example, the wearable device 200 acquires information about tourist spots and famous places from a network such as the Internet through the public network connection unit 212, based on the position information on the current position of the wearable device 200 acquired by the position information acquisition unit 213. The wearable device 200 can acquire information about tourist spots and famous places around or near the current position of the wearable device 200. In this case, the wearable device 200 can determine that a shooting chance arrives when the user wearing the wearable device 200 comes within a predetermined distance range from a subject to be shot, such as a tourist spot and a famous place.

Moreover, the wearable device 200 is in the form of a wristwatch such as the smartwatch, for example. The user can wear the wearable device 200 on his/her body such as a wrist.

The wearable device 200 searches for the digital camera 100 by using the connection unit 211 such as Bluetooth, and wirelessly connects to the connection unit 111 in the digital camera 100 when finding the digital camera 100. Thus, the wearable device 200 can establish communication with the digital camera 100. The wearable device 200 and the digital camera 100 can connect to and communicate with each other if the counterpart device is present within a connectable distance range, by previously registering the counterpart device through a pairing operation. More specifically, the wearable device 200 and the digital camera 100 can each confirm, if in a communicable state, that the counterpart device is within a communicable range, and can establish communication through wireless connection if the counterpart device is the one paired therewith. Thus, the wearable device 200 can determine that the user has the digital camera 100 in or near his/her hand and is in a state where he/she can shoot pictures with the digital camera 100.

The wearable device 200 operates in a shooting chance notification mode for notifying the arrival of a shooting chance, by previously pairing with the digital camera 100. When the wearable device 200 determines that a shooting chance arrives and that the user has the digital camera 100 in or near his/her hand, the arrival of the shooting chance is notified to the wearable device 200 worn by the user on his/her body.

A method for notifying the arrival of a shooting chance by the wearable device 200 is not particularly limited. For example, a message to the effect that a shooting chance arrives can be displayed on the display unit 206 in the wearable device 200. As shown in FIG. 4, the wearable device 200 can display, for example, a message notifying the arrival of the shooting chance, such as "Shooting chance!", on the display unit 206. In this event, the name of a subject to be shot may be displayed with the message, or the distance from the current position of the wearable device 200 to the subject to be shot may be displayed with the message. Alternatively, the wearable device 200 can also notify the user of the arrival of a shooting chance by making a notification sound to notify the arrival of the shooting chance, along with or instead of the display of the message on the display unit 206.

Note that the shooting chance notification mode of the wearable device 200 can be ended by canceling the pairing through an operation of the wearable device 200 or the digital camera 100. Alternatively, a setting for ending the mode may be provided, instead of canceling the pairing.

<Operations of Wearable Device>

Next, with reference to FIG. 5A, description is given of operations of and a method of controlling the wearable device 200 in the notification system 1 according to this embodiment. FIG. 5A is a flowchart showing the operations of the wearable device 200 according to this embodiment. FIG. 5A shows the operations of the wearable device 200 operating in the shooting chance notification mode.

In Step S1201, the control unit 201 in the wearable device 200 first searches for the digital camera 100 through near field communication by using the connection unit 211 such as Bluetooth. The control unit 201 searches for the digital camera 100 by looking for an advertising signal transmitted by the digital camera 100.

When finding the paired digital camera 100 in Step S1202 (Yes in Step S1202), the control unit 201 wirelessly connects to the digital camera 100 through the connection unit 211 in Step S1203. The control unit 201 transmits a connection request to the digital camera 100, thereby connecting to the digital camera 100. Thus, the control unit 201 establishes communication such as Bluetooth communication between the wearable device 200 and the digital camera 100. Therefore, the control unit 201 functions as a communication unit, together with the connection unit 211, to establish communication with the digital camera 100 when searching for and then finding the digital camera 100 through wireless communication.

On the other hand, when finding no digital camera (No in Step S1202), the control unit 201 determines in Step S1208 whether or not the shooting chance notification mode is ended. As long as it is determined that the shooting chance notification mode is not ended (No in Step S1208), the control unit 201 returns to Step S1201 and keeps on searching for the paired digital camera 100.

After the establishment of the communication between the wearable device 200 and the digital camera 100 paired therewith, the control unit 201 determines whether or not a shooting chance arrives in Step S1204. Thus, the control unit 201 functions as a determination unit to determine whether or not a shooting chance arrives.

Such determination of the arrival of the shooting chance may be made, as described above, when the user approaches a tourist spot and the like or when the time of a meal or the like preset by the user arrives.

For example, the control unit 201 determines whether or not a shooting chance arrives, based on position information on the current position of the wearable device 200 acquired by the position information acquisition unit 213. In this case, the control unit 201 acquires information about subjects to be shot, such as tourist spots and famous places around or near the current position of the wearable device 200, from a network such as the Internet through the public network connection unit 212. The control unit 201 determines that a shooting chance arrives when determining that the user comes within a predetermined distance range from the subject to be shot, based on the position information on the current position of the wearable device 200 acquired by the position information acquisition unit 213.

Alternatively, the control unit 201 can also determine that a shooting chance arrives, for example, when a predetermined time such as the time of a meal preset by the user arrives.

Figure 6:
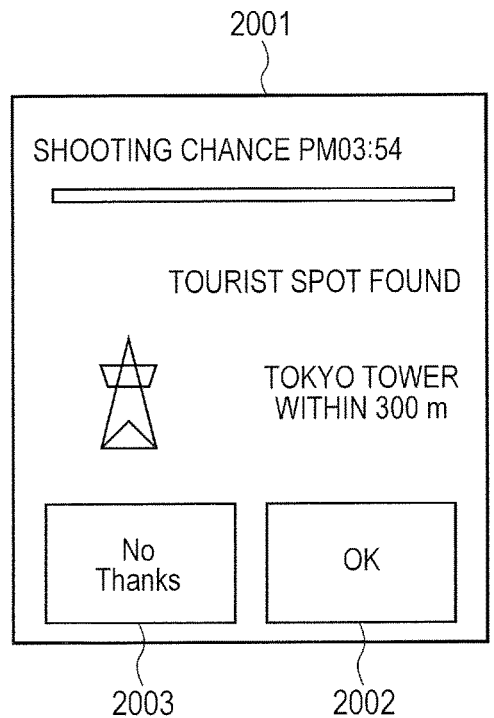
FIG. 6 is a schematic diagram showing an example of a notification screen for the arrival of a shooting chance displayed on a display unit in the wearable device according to the first embodiment of the present invention.

When determining in Step S1205 that the shooting chance arrives (Yes in Step S1205), the control unit 201 displays a notification screen for the arrival of the shooting chance on the display unit 206 in the wearable device 200 in Step S1206. FIG. 6 shows an example of the notification screen in this event, and description thereof is described later. Thus, in the case where the communication between the wearable device 200 and the digital camera 100 is established, the control unit 201 functions as a notification control unit to notify the user of the arrival of a shooting chance when determining that the shooting chance arrives. On the other hand, in the case where the communication between the wearable device 200 and the digital camera 100 is not established, the control unit 201 does not determine whether or not a shooting chance arrives, and naturally does not notify the user of the arrival of a shooting chance. Therefore, the control unit 201 notifies the user of the arrival of a shooting chance only when the communication between the wearable device 200 and the digital camera 100 is established.

When it is determined in Step S1205 that no shooting chance arrives (No in Step S1205), the processing moves to Step S1207. The processing moves to Step S1207 also when the notification screen is displayed in Step S1206 upon arrival of the shooting chance. In Step S1207, the control unit 201 determines whether or not the communication between the wearable device 200 and the digital camera 100 is disconnected. The control unit 201 returns to Step S1204 and keeps on determining whether or not a shooting chance arrives, unless the control unit 201 determines that the communication is disconnected (No in Step S1207).

On the other hand, when determining that the communication between the wearable device 200 and the digital camera 100 is disconnected (Yes in Step S1207), the control unit 201 terminates the processing of waiting for a shooting chance to arrive. Subsequently, in Step S1208, the control unit 201 determines whether or not the shooting chance notification mode is ended.

When it is determined that the shooting chance notification mode is not ended (No in Step S1208), the processing returns to Step S1201. In this case, as described above, the control unit 201 searches for a paired digital camera 100 and re-establishes communication with the digital camera if any found, thereby making it possible to notify the arrival of a shooting chance.

On the other hand, when it is determined that the shooting chance notification mode is ended (Yes in Step S1208), the control unit 201 terminates the operations of the wearable device 200 in the shooting chance notification mode. Note that the shooting chance notification mode can be ended, for example, by canceling the pairing through the operation of the wearable device 200 or the digital camera 100.

<Operations of Digital Camera>

Next, with reference to FIG. 5B, description is given of operations of and a method of controlling the digital camera 100 in the notification system 1 according to this embodiment. FIG. 5B is a flowchart showing the operations of the digital camera 100 according to this embodiment. FIG. 5B shows the operations of the digital camera 100 operating in the shooting chance notification mode.

In Step S1101, the control unit 101 in the digital camera 100 transmits an advertising signal so that the control unit 201 in the wearable device 200 can find the digital camera 100, by using the connection unit 111 such as Bluetooth. When finding the advertising signal, the control unit 201 in the wearable device 200 transmits a connection request to the digital camera 100.

Upon receipt of the connection request from the wearable device 200 in Step S1102 (Yes in Step S1102), the control unit 101 wirelessly connects to the wearable device 200 through the connection unit 111 in Step S1103. Thus, the control unit 101 establishes communication such as Bluetooth communication between the digital camera 100 and the wearable device 200.

On the other hand, when receiving no connection request from the wearable device 200 (No in Step S1102), the control unit 101 determines in Step S1105 whether or not the shooting chance notification mode is ended. As long as it is determined that the shooting chance notification mode is not ended (No in Step S1105), the control unit 101 returns to Step S1101 and keeps on transmitting the advertising signal.

Once the communication between the digital camera 100 and the wearable device 200 is established, the control unit 101 maintains the state where the communication with the wearable device 200 is established, unless the control unit 101 determines that the communication is disconnected in Step S1104 (No in Step S1104).

On the other hand, when determining that the communication between the digital camera 100 and the wearable device 200 is disconnected (Yes in Step S1104), the control unit 101 determines in Step S1105 whether or not the shooting chance notification mode is ended.

As long as it is determined that the shooting chance notification mode is not ended (No in Step S1105), the control unit 101 returns to Step S1101 and keeps on transmitting the advertising signal to wait for the next connection request from the wearable device 200.

On the other hand, when determining that the shooting chance notification mode is ended (Yes in Step S1105), the control unit 101 terminates the operations of the digital camera 100 in the shooting chance notification mode.

<Notification Screen for Arrival of Shooting Chance in Wearable Device>

Next, with reference to FIG. 6, description is given of a notification screen for the arrival of a shooting chance displayed on the display unit 206 in the wearable device 200. FIG. 6 is a schematic diagram showing an example of the notification screen for the arrival of a shooting chance displayed on the display unit 206 in the wearable device 200.

As described above with reference to FIG. 5A, when it is determined in Step S1205 that the shooting chance arrives, a notification screen 2001 to notify the arrival of the shooting chance is displayed on the display unit 206 in the wearable device 200 in Step S1206.

On the notification screen 2001, a message indicating what kind of shooting chance it is displayed, to notify the user of the arrival of the shooting chance. In the example of FIG. 6, the message shows that the user has reached around 300 m from Tokyo Tower, thereby letting the user know about the presence of Tokyo Tower that is a famous tourist spot and notifying the user of the arrival of a shooting chance to shoot Tokyo Tower as a shooting subject.

In the notification screen 2001, "OK" button 2002 and "No Thanks" button 2003 are displayed in a selectable manner. For example, the display unit 206 includes a touch panel, and the user can select either "OK" button 2002 or "No Thanks" button 2003 by touching a display region thereof. When the user selects "OK" button 2002, the notification screen 2001 is closed without any change. On the other hand, when the user selects "No Thanks" button 2003, no notification needed is set and thus the control unit 201 controls the operation of the wearable device 200 so as not to subsequently display the information of Tokyo Tower that is the information notified on the notification screen 2001.

As described above, when no notification needed is set by the user making input about a specific shooting subject to the wearable device 200, the control unit 201 can perform control not to notify the arrival of a shooting chance of the specific shooting subject on the display unit 206.

As described above, according to this embodiment, the arrival of a shooting chance is notified on the display unit 206 in the wearable device 200. Thus, the missing of shooting chances for the user carrying the digital camera 100 can be reduced or prevented. Moreover, according to this embodiment, the arrival of a shooting chance is notified only when communication is established between the digital camera 100 and the wearable device 200. Thus, the arrival of a shooting chance can be notified only when the user has the digital camera 100 with him/her. Therefore, according to this embodiment, the arrival of a shooting chance can be efficiently notified by suppressing the notification to the user when he/she does not have the digital camera 100 with him/her.

Note that the above description is given of the case where the wearable device 200 operates so as not to subsequently display the information of Tokyo Tower based on the item selected by the user on the notification screen for the arrival of a shooting chance displayed on the display unit 206 in the wearable device 200. In addition to or instead of such an operation, the control unit may perform control so as not to subsequently display such information by storing whether or not the user has the experience of actually shooting the subject with the digital camera 100 in response to the notification of the arrival of the shooting chance.

This embodiment is as follows.

The digital camera 100 includes a notification unit to notify the wearable device 200 of the fact that shooting has been performed, when communication such as Bluetooth communication is established with the wearable device 200 that is the counterpart of the communication during the execution of the shooting processing. The control unit 101 in the digital camera 100 can function as such a notification unit.

On the other hand, the control unit 201 in the wearable device 200 determines whether or not the arrival of a shooting chance has been recently notified, upon receipt of the above notification from the digital camera 100. If the arrival of a shooting chance has been notified, the control unit 201 determines that the user has shot a specific shooting subject notified through the notification of the arrival of a shooting chance and thus has the shooting experience. Therefore, the control unit 201 does not subsequently notify the arrival of a shooting chance of the same content. The control unit 201 can record the determination result on the shooting experience that the user has already shot the subject, as a database, in a storage unit such as the non-volatile memory 203 and the recording medium 210, for example. Also, the control unit 201 can determine whether or not to notify based on the database. Thus, as for the shooting subject for which the user has the shooting experience according to the notification of the arrival of a shooting chance, the control unit 201 does not subsequently notify the arrival of a shooting chance with the wearable device 200.

Thus, the control unit 201 can notify only necessary arrival of a shooting chance without notifying unnecessary arrival of a shooting chance.

Second Embodiment

With reference to FIGS. 7 to 10C, description is given of a notification system, a wearable device, an information processing apparatus, an imaging apparatus, and a control method thereof according to a second embodiment of the present invention. Note that the same constituent components as those in the first embodiment are denoted by the same reference numerals, and description thereof is omitted or simplified.

Figure 7:
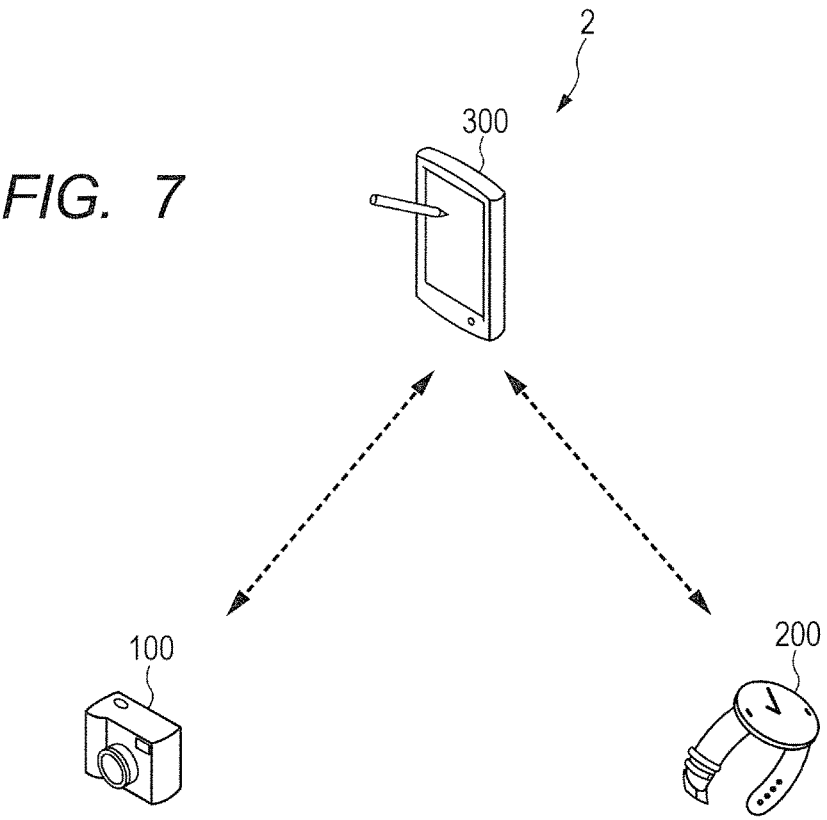
FIG. 7 is a schematic diagram showing an overall configuration of a notification system according to a second embodiment of the present invention.

First, with reference to FIG. 7, description is given of an overall configuration of the notification system according to this embodiment. FIG. 7 is a schematic diagram showing the overall configuration of the notification system according to this embodiment.

The notification system according to this embodiment also notifies a user of a digital camera that is the imaging apparatus of the arrival of a shooting chance with the digital camera, as in the case of the notification system according to the first embodiment described above. The notification system according to this embodiment is different from that of the first embodiment in determining the arrival of a shooting chance with a smartphone that is an information processing apparatus different from the wearable device 200.

As shown in FIG. 7, a notification system 2 according to this embodiment includes a digital camera 100 used by the user for shooting and a wearable device 200 that notifies the user of the arrival of a shooting chance. The notification system 2 according to this embodiment further includes a smartphone 300 that determines the arrival of a shooting chance. The smartphone 300 and the digital camera 100 are configured to be able to wirelessly communicate with each other. Likewise, the smartphone 300 and the wearable device 200 are configured to be able to wirelessly communicate with each other. Hereinafter, a configuration of the smartphone 300 is described in detail. Note that the digital camera 100 and the wearable device 200 have the same configurations as those in the first embodiment described above.

<Configuration of Smartphone>

Figure 8:
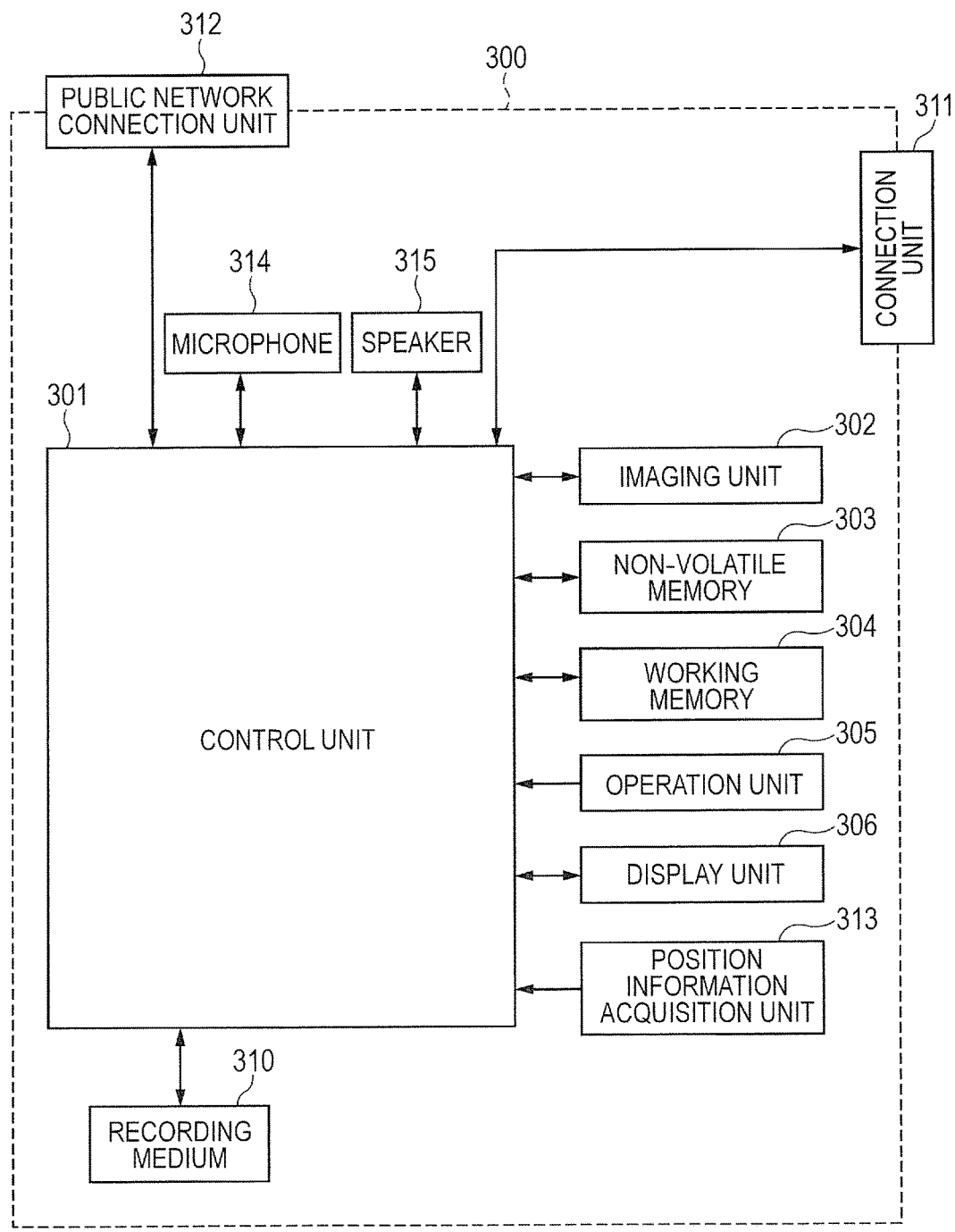
FIG. 8 is a block diagram showing a configuration of a smartphone according to the second embodiment of the present invention.

With reference to FIG. 8, description is given of the configuration of the smartphone 300 in the notification system 2 according to this embodiment. FIG. 8 is a block diagram showing the configuration of the smartphone 300 that is an example of the information processing apparatus in the notification system 2 according to this embodiment. Note that, although a smartphone with a communication function is described as an example of the information processing apparatus in this embodiment, the information processing apparatus is not limited thereto. For example, the information processing apparatus may be an information processing apparatus with a communication function, such as a digital camera, a portable media player, a so-called tablet device, and a personal computer, each having a wireless communication function.

As shown in FIG. 8, the smartphone 300 includes a control unit 301, an imaging unit 302, a non-volatile memory 303, and a working memory 304. The smartphone 300 also includes an operation unit 305, a display unit 306, a recording medium 310, a connection unit 311, a public network connection unit 312, and a position information acquisition unit 313. The smartphone 300 further includes a microphone 314 and a speaker 315.

The control unit 301 controls the respective units in the smartphone 300 according to inputted signals or programs to be described later. Note that, instead of the control unit 301 controlling the entire device, multiple pieces of hardware may control the entire device by sharing processing.

The imaging unit 302 includes a lens, an image sensor, and a signal processor. The image sensor converts subject light focused by the lens into an electric signal. The imaging unit 302 uses the signal processor to perform noise reduction processing and the like of the electric signal converted by the image sensor, and outputs digital data as image data. The image data obtained by the imaging unit 302 is stored in a buffer memory, subjected to predetermined arithmetic processing by the control unit 301, and then recorded in the recording medium 310.

The non-volatile memory 303 is an electrically erasable and recordable non-volatile memory, and stores various programs and the like to be executed by the control unit 301. It is assumed that a program for communicating with the digital camera 100 and the wearable device 200 is also held in the non-volatile memory 303, and is installed as a communication application. Note that processing of the smartphone 300 according to this embodiment is realized by reading a program provided by the communication application. Note that the communication application has a program for using basic functions of an OS installed in the smartphone 300. Note that the OS of the smartphone 300 may have a program for realizing the processing in this embodiment.

The working memory 304 is used as the buffer memory that temporarily holds the image data obtained by the imaging unit 302, an image display memory for the display unit 306, a work area for the control unit 301, and the like.

The operation unit 305 is used to receive instructions on the smartphone 300 from the user. The operation unit 305 includes, for example, operation members such as a power button for the user to instruct power on and off of the smartphone 300 and a touch panel formed in the display unit 306.

The display unit 306 displays image data, characters for dialogic operations, and the like. Note that the display unit 306 does not always have to be included in the smartphone 300. The smartphone 300 need only be connected to the display unit 306 and at least have a display control function to control the display on the display unit 306. The display unit 306 can be configured using a touch panel, for example, and can include some of or all of the functions of the operation unit 305.

The recording medium 310 can record, for example, the image data outputted from the imaging unit 302. The recording medium 310 can also record information other than the image data. The recording medium 310 may be configured detachably with respect to the smartphone 300 or may be included in the smartphone 300. More specifically, the smartphone 300 may have at least means for accessing the recording medium 310.

The connection unit 311 is an interface for connecting to an external device. The smartphone 300 according to this embodiment can be connected to the external device such as the digital camera 100 and the wearable device 200 through the connection unit 311 to exchange data with the connected external device. In this embodiment, the connection unit 311 includes an antenna, and the control unit 301 can be wirelessly connected to the external device such as the digital camera 100 and the wearable device 200 through the connection unit 311 including the antenna. Note that, as for the connection with the external device such as the digital camera 100 and the wearable device 200, the smartphone 300 may be directly connected thereto or may communicate therewith through a relay server.

For example, the connection unit 311 is a Bluetooth module, and can use a unique profile through Bluetooth as a protocol for communicating data. Note that the communication with the external device such as the digital camera 100 and the wearable device 200 is not limited thereto. For example, the connection unit 311 is a communication module for near field communication, and can include a wireless communication module such as an infrared communication module, a wireless LAN communication module, and a wireless USB. Furthermore, wired connection may be adopted for the connection unit 311, such as a USB cable, an HDMI, and IEEE1394.

The public network connection unit 312 is an interface for use in public wireless communication. The smartphone 300 can make a phone call to and perform data communication with another device through the public network connection unit 312. In the event of a phone call, the control unit 301 inputs and outputs voice signals through the microphone 314 and the speaker 315. It is assumed, in this embodiment, that the public network connection unit 312 includes an interface for communication using 3G. Note that not only 3G but also other communication methods may be used, such as LTE, WiMAX, ADSL, FTTH, and so-called 4G. Moreover, the connection unit 311 and the public network connection unit 312 do not always have to be configured using two independent pieces of hardware, but can also be realized by using one antenna, for example.

The position information acquisition unit 313 acquires position information on a current position of the smartphone 300. The current position of the smartphone 300 corresponds to the current position of the user carrying the smartphone 300. The position information acquisition unit 313 is, for example, a GPS module, and acquires the position information on the current position of the smartphone 300 by receiving radio waves from a GPS satellite for positioning. Note that the method used by the position information acquisition unit 313 to acquire the position information is not limited thereto. The position information acquisition unit 313 can also acquire the position information on the current position of the smartphone 300 by using position information on a base station used by the smartphone 300 for communication or position information on a wireless LAN access point, for example, besides the positioning by the GPS.

The description thus far is of the smartphone 300.

<Use Case 2>

With reference to FIG. 9, description is given of an example of a use case of the notification system 2 according to this embodiment.

FIG. 9 is a schematic diagram showing an operation of notifying a user of the arrival of a shooting chance in the notification system 2 according to this embodiment including the smartphone 300 in addition to the digital camera 100 and the wearable device 200.

The smartphone 300 is more sophisticated than the wearable device 200, and can determine more sophisticatedly the arrival of a shooting chance. The smartphone 300 is carried and used by the user of the digital camera 100.

Also, there is a case where the wearable device 200 does not include a client function among functions of a server and a client of communication such as Bluetooth communication. In this embodiment, the smartphone 300 with the client function is communicably connected to the digital camera 100 with a server function and the wearable device 200 with a server function. Thus, the same functions as those in the first embodiment can be provided.

In the case of the notification system 2 according to this embodiment, the smartphone 300 determines a connection status between the digital camera 100 and the wearable device 200 through communication such as Bluetooth communication. The smartphone 300 searches for the digital camera 100 and the wearable device 200 by using the connection unit 311, and wirelessly connects to the digital camera 100 and the wearable device 200 when finding the digital camera 100 and the wearable device 200. Thus, the smartphone 300 can establish communication with the digital camera 100 and the wearable device 200. When communicably connected to the digital camera 100 and the wearable device 200, the smartphone 300 can determine that the user has the digital camera 100 and the wearable device 200 in or near his/her hand and is in a state where he/she can shoot pictures with the digital camera 100. Moreover, when determining that the user has the digital camera 100 and the wearable device 200 in or near his/her hand, the smartphone 300 can determine that the arrival of a shooting chance can be notified to the wearable device 200 worn by the user on his/her body.

The smartphone 300 can determine the arrival of a shooting chance for shooting with the digital camera 100, in the same manner as the wearable device 200 according to the first embodiment.

For example, a user who takes pictures of every meal, i.e., breakfast, lunch, and dinner, with the digital camera 100 presets the time of each of the meals, breakfast, lunch, and dinner, with the smartphone 300. In this case, when the time of the meal preset by the user arrives, the smartphone 300 determines that a shooting chance arrives. Alternatively, the user presets, for example, the times of events, based on an itinerary or the like, with the smartphone 300. In this case, the smartphone 300 determines that a shooting chance arrives upon every arrival of the time of the event. Moreover, the user presets regular time intervals for setting a shooting pace, for example, with the smartphone 300. In this case, the smartphone 300 determines that a shooting chance arrives upon every arrival of the time when the time interval preset by the user has elapsed.

In another example, the smartphone 300 acquires information about tourist spots and famous places from a network such as the Internet through the public network connection unit 312, based on the position information on the current position of the smartphone 300 acquired by the position information acquisition unit 313. The smartphone 300 can acquire information about subjects to be shot such as tourist spots and famous places around or near the current position of the smartphone 300. In this case, the smartphone 300 can determine that a shooting chance arrives when the user carrying the smartphone 300 comes within a predetermined distance range from a subject to be shot, such as a tourist spot and a famous place.

When determining that a shooting chance arrives, the smartphone 300 transmits a request to notify the arrival of a shooting chance to the wearable device 200.

Upon receipt of the request to notify the arrival of a shooting chance from the smartphone 300, the wearable device 200 can notify the user of the arrival of a shooting chance in the same manner as the first embodiment.

<Operations of Smartphone>

Next, with reference to FIG. 10A, description is given of operations of and a method of controlling the smartphone 300 in the notification system 2 according to this embodiment. FIG. 10A is a flowchart showing the operations of the smartphone 300 according to this embodiment. FIG. 10A shows the operations of the smartphone 300 operating in a shooting chance notification mode.

When the smartphone 300 performs Bluetooth communication with the digital camera 100 and the wearable device 200, the smartphone 300 needs to be paired with both of the digital camera 100 and the wearable device 200. The smartphone 300 thus paired can operate in the shooting chance notification mode.

In Step S2301, the control unit 301 in the smartphone 300 first searches for the digital camera 100 and the wearable device 200 through near field communication by using the connection unit 311 such as Bluetooth. The control unit 301 searches for the digital camera 100 and the wearable device 200 by looking for advertising signals transmitted by the digital camera 100 and the wearable device 200, respectively.

When finding the paired digital camera 100 or wearable device 200 in Step S2302 (Yes in Step S2302), the control unit 301 wirelessly connects to the device thus found through the connection unit 311 in Step S2303. The control unit 301 transmits a connection request to the found digital camera 100 or wearable device 200, thereby connecting to the digital camera 100 or the wearable device 200. Thus, the control unit 301 establishes communication such as Bluetooth communication between the smartphone 300 and the found digital camera 100 or wearable device 200. Therefore, the control unit 301 functions as a communication unit, together with the connection unit 311, to establish communication with the digital camera 100 and the wearable device 200 when searching for and then finding the digital camera 100 and the wearable device 200 through wireless communication.

Then, in Step S2304, the control unit 301 determines whether or not the smartphone 300 is connected to both of the paired digital camera 100 and wearable device 200.

When it cannot be determined that the smartphone 300 is connected to both of the digital camera 100 and the wearable device 200 (No in Step S2304), the control unit 301 determines in Step S2309 whether or not the shooting chance notification mode is ended. As long as it is determined that the shooting chance notification mode is not ended (No in Step S2309), the control unit 301 returns to Step S2301 and keeps on searching for the unconnected device between the paired digital camera 100 and wearable device 200.

After the establishment of the communication between the smartphone 300 and both of the paired digital camera 100 and wearable device 200 (Yes in Step S2304), the control unit 301 determines whether or not a shooting chance arrives in Step S2305. Thus, the control unit 301 functions as a determination unit to determine whether or not a shooting chance arrives.

Such determination of the arrival of the shooting chance may be made, as described above, when the user approaches a tourist spot and the like or when the time of a meal or the like preset by the user arrives.

For example, the control unit 301 determines whether or not a shooting chance arrives, based on position information on the current position of the smartphone 300 acquired by the position information acquisition unit 313. In this case, the control unit 301 acquires information about subjects to be shot, such as tourist spots and famous places around or near the current position of the smartphone 300, from a network such as the Internet through the public network connection unit 312. The control unit 301 determines that a shooting chance arrives when determining that the user comes within a predetermined distance range from the subject to be shot, based on the position information on the current position of the smartphone 300 acquired by the position information acquisition unit 313.

Alternatively, the control unit 301 can also determine that a shooting chance arrives, for example, when a predetermined time such as the time of a meal preset by the user arrives.

When determining in Step S2306 that the shooting chance arrives (Yes in Step S2306), the control unit 301 transmits a request to display a notification screen for the arrival of the shooting chance, as a request to notify the arrival of the shooting chance, to the wearable device 200 in Step S2307. The display request transmitted here is to request the wearable device 200 to display the notification screen for the arrival of the shooting chance on the display unit 206 in the wearable device 200. The control unit 301 causes the wearable device 200 to notify the user of the arrival of a shooting chance when determining that the shooting chance arrives in the case where the communication between the smartphone 300 and the digital camera 100 as well as the wearable device 200 is established. Thus, the control unit 301 functions as a notification control unit to cause the wearable device 200 to notify the user of the arrival of a shooting chance. On the other hand, when the communication between the smartphone 300 and the digital camera 100 as well as the wearable device 200 is not established, the control unit 301 does not determine whether or not a shooting chance arrives, and naturally stops the wearable device 200 from notifying the user of the arrival of a shooting chance. The control unit 301 causes the wearable device 200 to notify the user of the arrival of a shooting chance only when the communication between the smartphone 300 and the digital camera 100 as well as the wearable device 200 is established.

When it is determined in Step S2306 that no shooting chance arrives (No in Step S2306), the processing moves to Step S2308. The processing moves to Step S2308 also after the transmission of the request to display the notification screen in Step S2307 upon arrival of the shooting chance. In Step S2308, the control unit 301 determines whether or not the communication between the smartphone 300 and any of the digital camera 100 and the wearable device 200 is disconnected. The control unit 301 returns to Step S2305 and keeps on determining whether or not a shooting chance arrives, unless the control unit 301 determines that the communication is disconnected (No in Step S2308).

On the other hand, when determining that the communication between the smartphone 300 and any of the digital camera 100 and the wearable device 200 is disconnected (Yes in Step S2308), the control unit 301 terminates the processing of waiting for a shooting chance to arrive. Subsequently, in Step S2309, the control unit 301 determines whether or not the shooting chance notification mode is ended.

When it is determined that the shooting chance notification mode is not ended (No in Step S2309), the processing returns to Step S2301. In this case, the control unit 301 searches for paired digital camera 100 and wearable device 200, and re-establishes communication therewith if any found, thereby making it possible to notify the arrival of a shooting chance.

On the other hand, when it is determined that the shooting chance notification mode is ended (Yes in Step S2309), the control unit 301 terminates the operations of the smartphone 300 in the shooting chance notification mode. Note that the shooting chance notification mode can be ended by canceling the pairing through operation of the smartphone 300, the wearable device 200 or the digital camera 100.

<Operations of Wearable Device>

Next, with reference to FIG. 10B, description is given of operations of and a method of controlling the wearable device 200 in the notification system 2 according to this embodiment. FIG. 10B is a flowchart showing the operations of the wearable device 200 according to this embodiment. FIG. 10B shows the operations of the wearable device 200 operating in the shooting chance notification mode.

In Step S2201, the control unit 201 in the wearable device 200 first transmits an advertising signal for the control unit 301 in the smartphone 300 to find the wearable device 200, by using the connection unit 211 such as Bluetooth. When finding the advertising signal, the control unit 301 in the smartphone 300 transmits a connection request to the wearable device 200.

Upon receipt of the connection request from the smartphone 300 in Step S2202 (Yes in Step S2202), the control unit 201 wirelessly connects to the smartphone 300 through the connection unit 211 in Step S2203. Thus, the control unit 201 establishes communication such as Bluetooth communication between the wearable device 200 and the smartphone 300.

On the other hand, upon receipt of no connection request from the smartphone 300 (No in Step S2202), the control unit 201 determines in Step S2207 whether or not the shooting chance notification mode is ended. As long as it is determined that the shooting chance notification mode is not ended (No in Step S2207), the control unit 201 returns to Step S2201 and keeps on transmitting the advertising signal.

After the establishment of the communication between the wearable device 200 and the smartphone 300, the control unit 201 waits for a request to display the notification screen for the arrival of a shooting chance from the smartphone 300 in Step S2204.

When determining that the request to display the notification screen is received (Yes in Step S2204), the control unit 201 displays the notification screen for the arrival of a shooting chance on the display unit 206 in the wearable device 200 in Step S2205. In this case, again, the same notification screen as that in the first embodiment can be displayed, and, for example, the notification screen shown in FIG. 6 can be displayed.

On the other hand, when it is determined that the request to display the notification screen is not received (No in Step S2204), the processing moves to Step S2206. The processing moves to Step S2206 also after the display of the notification screen in Step S2205 upon receipt of the request to display the notification screen. In Step S2206, the control unit 201 determines whether or not the communication between the wearable device 200 and the smartphone 300 is disconnected. The control unit 201 returns to Step S2204 and keeps on waiting for the request to display the notification screen from the smartphone 300, unless the control unit 201 determines that the communication is disconnected (No in Step S2206).

On the other hand, when determining that the communication between the wearable device 200 and the smartphone 300 is disconnected (Yes in Step S2206), the control unit 201 terminates the processing of waiting for the request to display the notification screen. Subsequently, in Step S2207, the control unit 201 determines whether or not the shooting chance notification mode is ended.

When it is determined that the shooting chance notification mode is not ended (No in Step S2207), the processing returns to Step S2201. In this case, as described above, the control unit 201 keeps on transmitting the advertising signal and waits for the next connection request from the smartphone 300.

On the other hand, when it is determined that the shooting chance notification mode is ended (Yes in Step S2207), the control unit 201 terminates the operations of the wearable device 200 in the shooting chance notification mode. Note that the shooting chance notification mode can be ended, for example, by canceling the pairing through operation of the smartphone 300, the wearable device 200 or the digital camera 100.

<Operations of Digital Camera>

Figure 10C:
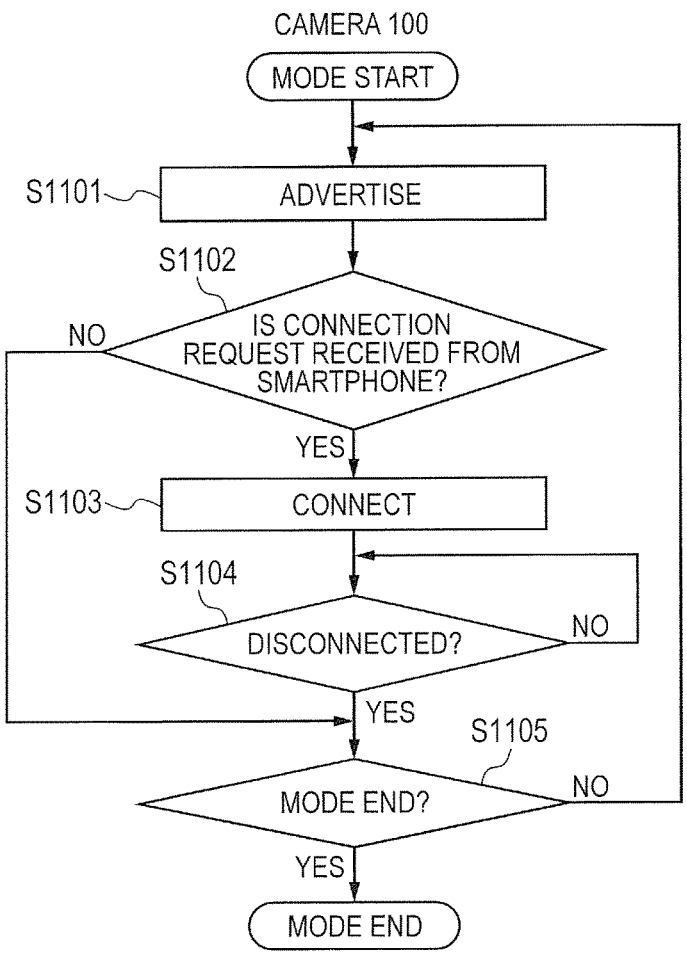
FIG. 10C is a flowchart showing operations of a digital camera according to the second embodiment of the present invention.

Next, with reference to FIG. 10C, description is given of operations of and a method of controlling the digital camera 100 in the notification system 2 according to this embodiment. FIG. 10C is a flowchart showing the operations of the digital camera 100 according to this embodiment. FIG. 10C shows the operations of the digital camera 100 operating in the shooting chance notification mode.

The operations of the digital camera 100 according to this embodiment are approximately the same as those of the digital camera 100 according to the first embodiment. The digital camera 100 according to this embodiment is different from the digital camera 100 according to the first embodiment in connecting to the smartphone 300 by receiving a connection request from the smartphone 300 instead of a connection request from the wearable device 200.

In Step S1101, the control unit 101 in the digital camera 100 first transmits an advertising signal so that the control unit 301 in the smartphone 300 can find the digital camera 100, by using the connection unit 111 such as Bluetooth.

When finding the advertising signal, the control unit 301 in the smartphone 300 transmits a connection request to the digital camera 100.

Upon receipt of the connection request from the smartphone 300 in Step S1102 (Yes in Step S1102), the control unit 101 wirelessly connects to the smartphone 300 through the connection unit 111 in Step S1103. Thus, the control unit 101 establishes communication such as Bluetooth communication between the digital camera 100 and the smartphone 300.

On the other hand, when receiving no connection request from the smartphone 300 (No in Step S1102), the control unit 101 determines in Step S1105 whether or not the shooting chance notification mode is ended. As long as it is determined that the shooting chance notification mode is not ended (No in Step S1105), the control unit 101 returns to Step S1101 and keeps on transmitting the advertising signal.

Once the communication between the digital camera 100 and the smartphone 300 is established, the control unit 101 maintains the state where the communication with the smartphone 300 is established, unless the control unit 101 determines that the communication is disconnected in Step S1104 (No in Step S1104).

On the other hand, when determining that the communication between the digital camera 100 and the smartphone 300 is disconnected (Yes in Step S1104), the control unit 101 determines in Step S1105 whether or not the shooting chance notification mode is ended.

As long as it is determined that the shooting chance notification mode is not ended (No in Step S1105), the control unit 101 returns to Step S1101 and keeps on transmitting the advertising signal to wait for the next connection request from the smartphone 300.

On the other hand, when determining that the shooting chance notification mode is ended (Yes in Step S1105), the control unit 101 terminates the operations of the digital camera 100 in the shooting chance notification mode.

As described above, according to this embodiment, the arrival of a shooting chance is notified on the display unit 206 in the wearable device 200. Thus, the missing of shooting chances for the user carrying the digital camera 100 can be reduced or prevented. Moreover, according to this embodiment, the arrival of a shooting chance is notified only when communication is established between the digital camera 100 and the smartphone 300. Thus, the arrival of a shooting chance can be notified only when the user has the digital camera 100 with him/her. Therefore, according to this embodiment, the arrival of a shooting chance can be efficiently notified by suppressing the notification to the user when he/she does not have the digital camera 100 with him/her.

Note that, in this embodiment, no notification needed for the arrival of a shooting chance can be set by the user making input about a specific shooting subject to the wearable device 200, as in the case of the first embodiment. When no notification needed is set for the specific shooting subject, the control unit 301 in the smartphone 300 can perform control not to transmit a request to display the notification screen for the arrival of a shooting chance of the specific shooting subject to the wearable device 200.

Moreover, in this embodiment, the control unit may perform control so as not to subsequently transmit a request to display the notification screen to the wearable device 200 by storing whether or not the user has the experience of actually shooting the subject with the digital camera 100 in response to the notification of the arrival of the shooting chance, as in the case of the first embodiment.

This embodiment is as follows.

The digital camera 100 includes a notification unit to notify the smartphone 300 of the fact that shooting has been performed, when communication such as Bluetooth communication is established with the smartphone 300 that is the counterpart of the communication during the execution of the shooting processing. The control unit 101 in the digital camera 100 can function as such a notification unit.

On the other hand, the control unit 301 in the smartphone 300 determines whether or not a request to display the notification screen for the arrival of a shooting chance has been recently transmitted to the wearable device 200, upon receipt of the above notification from the digital camera 100. If the display request has been transmitted, the control unit 301 determines that the user has shot a specific shooting subject notified through the notification of the arrival of a shooting chance and thus has the shooting experience. Therefore, the control unit 301 does not subsequently transmit a request to display the notification screen for the arrival of a shooting chance of the same content to the wearable device 200. The control unit 301 can record the determination result on the shooting experience that the user has already shot the subject, as a database, in a storage unit such as the non-volatile memory 303 and the recording medium 310, for example. Also, the control unit 301 can determine whether or not to transmit a request to display the notification screen, based on the database. Thus, as for the shooting subject for which the user has the shooting experience according to the notification of the arrival of a shooting chance, the control unit 301 stops the wearable device 200 from notifying the arrival of a shooting chance.

Third Embodiment

Figure 11:
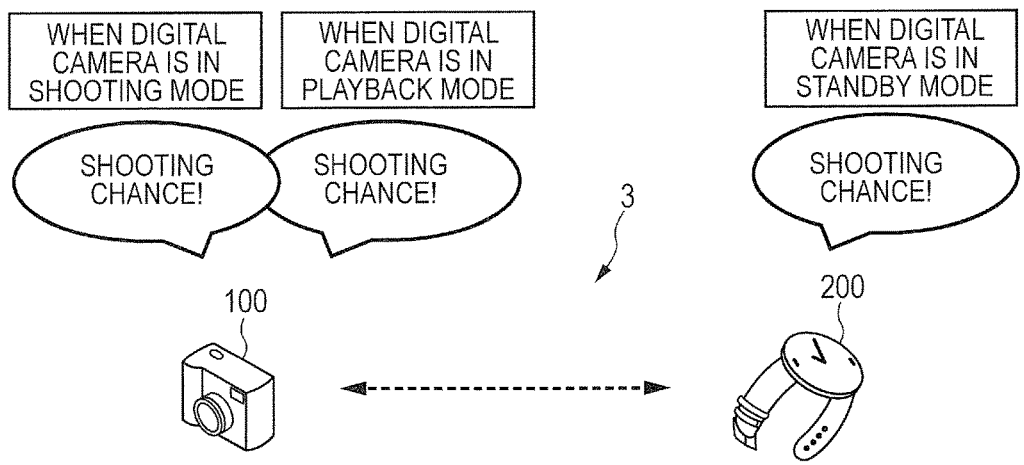
FIG. 11 is a schematic diagram showing an operation of notifying a user of the arrival of a shooting chance in a notification system according to a third embodiment of the present invention.

With reference to FIGS. 11 to 13, description is given of a notification system, a wearable device, an imaging apparatus, and a control method thereof according to a third embodiment of the present invention. Note that the same constituent components as those in the first and second embodiments are denoted by the same reference numerals, and description thereof is omitted or simplified.

<Use Case 3>

The notification system according to this embodiment has approximately the same configuration as that of the notification system 1 according to the first embodiment. With reference to FIG. 11, description is given of an example of a use case of the notification system according to this embodiment. FIG. 11 is a schematic diagram showing an operation of notifying the user of the arrival of a shooting chance in the notification system 3 according to this embodiment including a digital camera 100 and a wearable device 200.

The notification system 3 according to this embodiment is different from the notification system 1 according to the first embodiment in a configuration that a shooting chance can also be notified on a display unit 106 in the digital camera 100.

In the notification system 3 according to this embodiment, the wearable device 200 worn by the user on his/her body can determine a connection state with the digital camera 100 through communication such as Bluetooth communication, and determine that the user has the digital camera 100 in or near his/her hand. In the notification system 3 according to this embodiment, the wearable device 200 determines the arrival of a shooting chance. The third embodiment is the same as the first embodiment in the points described above.

Here, in this embodiment, a notification screen for the arrival of a shooting chance can be displayed on the display unit 206 in the wearable device 200 or displayed on the display unit 106 in the digital camera 100 depending on a mode of the digital camera 100.

The modes of the digital camera 100 include a "shooting mode" in shooting standby, a "playback mode" to play back shot images on the display unit 106, and a "standby mode" such as a power-saving state and a power off state, which is set when not in use by the user.

When the digital camera 100 is in the "shooting mode" or "playback mode", this is assumed to be mainly the case that the user is operating the digital camera 100. Therefore, notifying the arrival of a shooting chance with the digital camera 100 is more effective than notifying with the wearable device 200. In the notification system 3 according to this embodiment, the arrival of a shooting chance is notified to the user with the digital camera 100 when the digital camera 100 is in the "shooting mode" or "playback mode".

On the other hand, when the digital camera 100 is in the "standby mode", this is assumed to be mainly the case that the user is not operating the digital camera 100 and has the digital camera 100 in his/her bag. Therefore, in this case, notifying the arrival of a shooting chance with the wearable device 200 is more effective than notifying with the digital camera 100. In the notification system 3 according to this embodiment, the arrival of a shooting chance is notified to the user with the wearable device 200 when the digital camera 100 is in the "standby mode".

Thus, in the notification system 3 according to this embodiment, the arrival of a shooting chance can be notified to the user by more effective means depending on the mode of the digital camera 100.

<Operations of Wearable Device>

Figure 12A:
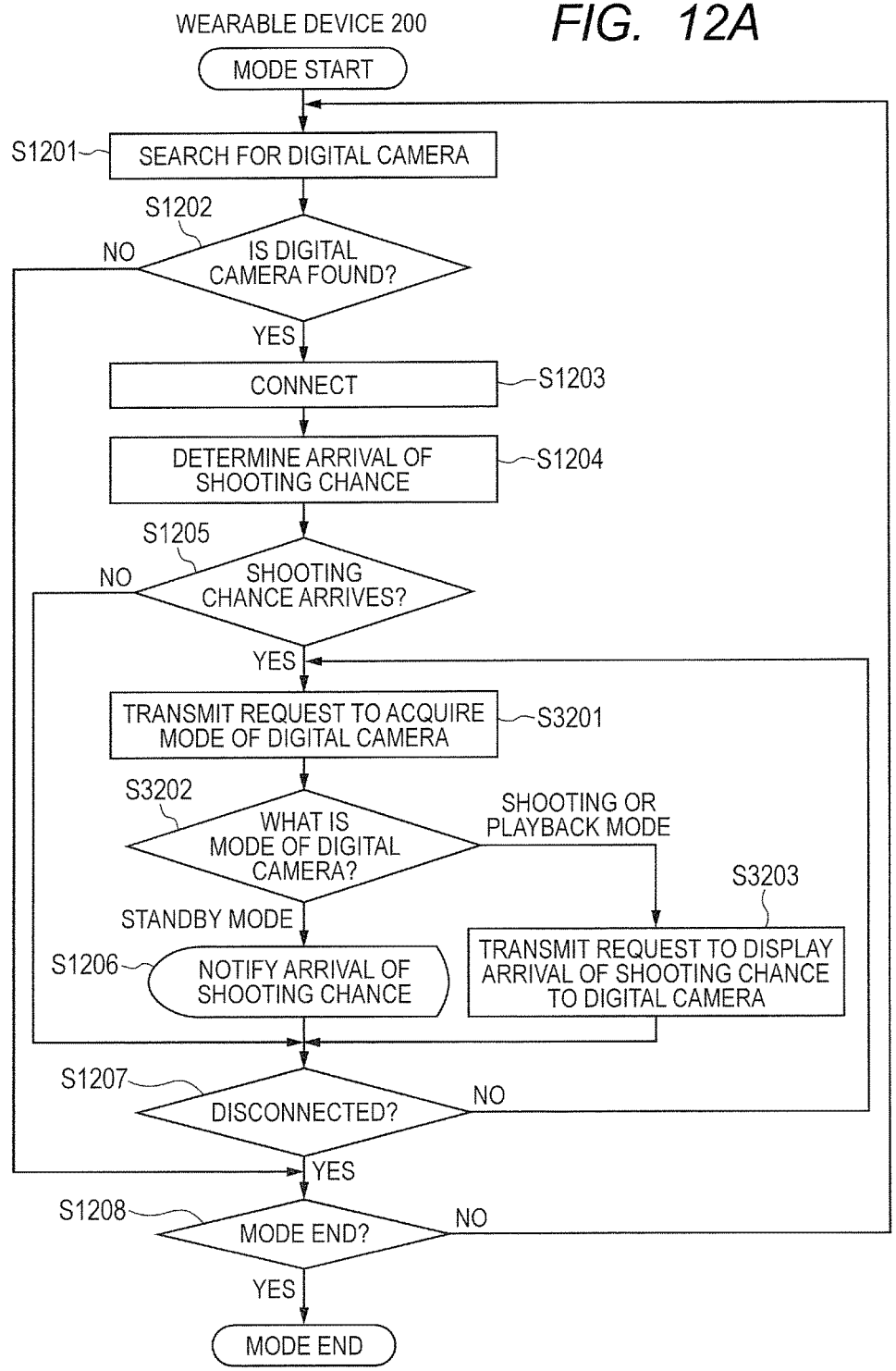
FIG. 12A is a flowchart showing operations of a wearable device according to the third embodiment of the present invention.

Next, with reference to FIG. 12A, description is given of operations of and a method of controlling the wearable device 200 in the notification system 3 according to this embodiment. FIG. 12A is a flowchart showing the operations of the wearable device 200 according to this embodiment. FIG. 12A shows the operations of the wearable device 200 operating in the shooting chance notification mode.

In Step S1201, the control unit 201 in the wearable device 200 first searches for the digital camera 100 through near field communication by using the connection unit 211 such as Bluetooth. The control unit 201 searches for the digital camera 100 by looking for an advertising signal transmitted by the digital camera 100.

When finding the paired digital camera 100 in Step S1202 (Yes in Step S1202), the control unit 201 wirelessly connects to the digital camera 100 through the connection unit 211 in Step S1203. The control unit 201 transmits a connection request to the digital camera 100, thereby connecting to the digital camera 100. Thus, the control unit 201 establishes communication such as Bluetooth communication between the wearable device 200 and the digital camera 100.

On the other hand, when finding no digital camera (No in Step S1202), the control unit 201 determines in Step S1208 whether or not the shooting chance notification mode is ended. As long as it is determined that the shooting chance notification mode is not ended (No in Step S1208), the control unit 201 returns to Step S1201 and keeps on searching for the paired digital camera 100.

After the establishment of the communication between the wearable device 200 and the digital camera 100 paired therewith, the control unit 201 determines whether or not a shooting chance arrives in Step S1204.

Such determination of the arrival of the shooting chance may be made, as described above, when the user approaches a tourist spot and the like or when the time of a meal or the like preset by the user arrives.

The control unit 201 can determine the arrival of a shooting chance in the same manner as the first embodiment.

When determining in Step S1205 that the shooting chance arrives, the control unit 201 transmits a request to acquire the mode of the digital camera 100 to the digital camera 100 in Step S3201. Upon receipt of the request to acquire the mode, the digital camera 100 transmits mode information indicating the mode thereof to the wearable device 200.

Subsequently, in Step S3202, the control unit 201 determines the mode of the digital camera 100 based on the mode information transmitted from the digital camera 100. Thus, the control unit 201 functions as a mode acquisition unit to acquire the mode of the digital camera 100.

When it is determined that the mode of the digital camera 100 is the "shooting mode" or "playback mode" ("shooting or playback mode" in Step S3201), the control unit 201 transmits a request to display a notification screen for the arrival of a shooting chance to the digital camera 100 in Step S3203. Note that, in this case, the control unit 201 can or does not have to display the notification screen for the arrival of a shooting chance on the display unit 206 in the wearable device 200.

On the other hand, when it is determined that the mode of the digital camera 100 is the "standby mode" ("standby mode" in Step S3202), the control unit 201 displays the notification screen for the arrival of a shooting chance on the display unit 206 in the wearable device 200 in Step S1206. FIG. 6 shows an example of the notification screen in this event.

When it is determined in Step S1205 that no shooting chance arrives (No in Step S1205), the processing moves to Step S1207. The processing moves to Step S1207 also after the request to display the notification screen is transmitted in Step S3203 upon arrival of a shooting chance or after the notification screen is displayed in Step S1206. In Step S1207, the control unit 201 determines whether or not the communication between the wearable device 200 and the digital camera 100 is disconnected. The control unit 201 returns to Step S1204 and keeps on determining whether or not a shooting chance arrives, unless the control unit 201 determines that the communication is disconnected (No in Step S1207).

On the other hand, when determining that the communication between the wearable device 200 and the digital camera 100 is disconnected (Yes in Step S1207), the control unit 201 terminates the processing of waiting for a shooting chance to arrive. Subsequently, in Step S1208, the control unit 201 determines whether or not the shooting chance notification mode is ended.

When it is determined that the shooting chance notification mode is not ended (No in Step S1208), the processing returns to Step S1201. In this case, as described above, the control unit 201 searches for a paired digital camera 100 and re-establishes communication with the digital camera if any found, thereby making it possible to notify the arrival of a shooting chance.

On the other hand, when it is determined that the shooting chance notification mode is ended (Yes in Step S1208), the control unit 201 terminates the operations of the wearable device 200 in the shooting chance notification mode. Note that the shooting chance notification mode can be ended, for example, by canceling the pairing through the operation of the wearable device 200 or the digital camera 100.

<Operations of Digital Camera>

Next, with reference to FIG. 12B, description is given of operations of and a method of controlling the digital camera 100 in the notification system 3 according to this embodiment. FIG. 12B is a flowchart showing the operations of the digital camera 100 according to this embodiment. FIG. 12B shows the operations of the digital camera 100 operating in the shooting chance notification mode.

In Step S1101, the digital camera 100 first transmits an advertising signal so that the control unit 201 in the wearable device 200 can find the digital camera 100, by using the connection unit 111 such as Bluetooth. When finding the advertising signal, the control unit 201 in the wearable device 200 transmits a connection request to the digital camera 100.

Upon receipt of the connection request from the wearable device 200 in Step S1102 (Yes in Step S1102), the control unit 101 wirelessly connects to the wearable device 200 through the connection unit 111 in Step S1103. Thus, the control unit 101 establishes communication such as Bluetooth communication between the digital camera 100 and the wearable device 200.

On the other hand, when receiving no connection request from the wearable device 200 in Step S1102 (No in Step S1102), the control unit 101 determines in Step S1105 whether or not the shooting chance notification mode is ended. As long as it is determined that the shooting chance notification mode is not ended (No in Step S1105), the control unit 101 returns to Step S1101 and keeps on transmitting the advertising signal.

Once the communication between the digital camera 100 and the wearable device 200 is established, the control unit 101 waits for a request to acquire the mode from the wearable device 200 in Step S3101.

When it is determined that the acquisition request is received (Yes in Step S3101), the control unit 101 transmits mode information indicating the current mode of the digital camera 100 to the wearable device 200 in Step S3102.

After the transmission of the mode information, the control unit 101 waits for a request to display a notification screen for the arrival of a shooting chance from the wearable device 200 in Step S3103. Note that the control unit 101 moves to Step S3103 to wait for the request to display the notification screen also when it is determined that no acquisition request is received (No in Step S3101).

When it is determined that the display request is received (Yes in Step S3103), the control unit 101 displays the notification screen for the arrival of a shooting chance on the display unit 106 in the digital camera 100 in Step S3104. FIG. 13 shows an example of the notification screen in this event, which is described later. Thus, the control unit 101 functions as a display control unit to display the notification screen that notifies the arrival of a shooting chance on the display unit 106, based on the display request from the wearable device 200 that is the external device which has determined that the shooting chance arrives. Note that, when it is not determined that the display request is received (No in Step S3103), the processing moves to Step S1104.

Once the communication between the digital camera 100 and the wearable device 200 is established, the control unit 101 maintains the state where the communication with the wearable device 200 is established, unless the control unit 101 determines that the communication is disconnected in Step S1104 (No in Step S1104). In this case, the control unit 101 returns to Step S3101 to wait for a request to acquire the mode from the wearable device 200.

On the other hand, when determining that the communication between the digital camera 100 and the wearable device 200 is disconnected (Yes in Step S1104), the control unit 101 determines in Step S1105 whether or not the shooting chance notification mode is ended.

As long as it is determined that the shooting chance notification mode is not ended (No in Step S1105), the control unit 101 returns to Step S1101 and keeps on transmitting the advertising signal to wait for the next connection request from the wearable device 200.

On the other hand, when determining that the shooting chance notification mode is ended (Yes in Step S1105), the control unit 101 terminates the operations of the digital camera 100 in the shooting chance notification mode.

<Notification Screen for Arrival of Shooting Chance in Digital Camera>

Next, with reference to FIG. 13, description is given of a notification screen for the arrival of a shooting chance displayed on the display unit 106 in the digital camera 100. FIG. 13 is a schematic diagram showing an example of the notification screen for the arrival of a shooting chance displayed on the display unit 106 in the digital camera 100.

As described above with reference to FIG. 12B, when it is determined in Step S3103 that the request to display the notification screen for the arrival of a shooting chance is received from the wearable device 200, the arrival of a shooting chance is notified with the digital camera 100. More specifically, a notification screen 1001 for the arrival of the shooting chance is displayed on the display unit 106 in the digital camera 100 in Step S3104.

On the notification screen 1001, a message indicating what kind of shooting chance it is displayed, to notify the user of the arrival of the shooting chance, as in the case of the notification screen 2001 shown in FIG. 6, which is displayed by the wearable device 200. In the example of FIG. 13, again, the message shows that the user has reached around 300 m from Tokyo Tower, thereby letting the user know about the presence of Tokyo Tower that is a famous tourist spot and notifying the user of the arrival of a shooting chance to shoot Tokyo Tower as a shooting subject.

In the notification screen 1001, "OK" button 1002 and "No Thanks" button 1003 are displayed in a selectable manner. For example, the display unit 106 includes a touch panel, and the user can select either "OK" button 1002 or "No Thanks" button 1003 by touching a display region thereof. When the user selects "OK" button 1002, the notification screen is closed without any change. On the other hand, when the user selects "No Thanks" button 1003, no notification needed is set and thus the digital camera 100 operates so as not to subsequently display the information of Tokyo Tower that is the information notified on the notification screen 1001.

Note that, as for the shooting subject for which the user has the shooting experience according to the notification of the arrival of a shooting chance, it can be set that the arrival of a shooting chance is not notified with the digital camera 100, as in the case of the notification of the arrival of a shooting chance with the wearable device 200 described in the first and second embodiments.

As described above, according to this embodiment, the arrival of a shooting chance is notified on the display unit 106 in the digital camera 100 depending on the mode of the digital camera 100. Thus, the missing of shooting chances for the user carrying the digital camera 100 can be reduced or prevented.

Note that the above description is given of the configuration with two parties, the wearable device 200 and the digital camera 100, based on the first embodiment. However, the present invention is not limited thereto. The notification of the arrival of a shooting chance may be realized with the digital camera 100 as in the above case, by adopting a three-party configuration obtained by adding the smartphone 300 to the wearable device 200 and the digital camera 100, based on the second embodiment. In this case, as described above, the digital camera 100 notifies mode information indicating the mode thereof to the smartphone 300. The control unit 301 in the smartphone 300 functions as a mode acquisition unit, and acquires the mode of the digital camera 100 based on the mode information notified from the digital camera 100. Furthermore, the control unit 301 transmits a request to display the notification screen for the arrival of a shooting chance to the digital camera 100 or the wearable device 200, depending on the mode of the digital camera 100 thus obtained. Upon receipt of the request to display the notification screen for the arrival of a shooting chance, the digital camera 100 displays the notification screen for the arrival of a shooting chance on the display unit 106 as described above. Moreover, upon receipt of the request to display the notification screen for the arrival of a shooting chance, the wearable device 200 displays the notification screen for the arrival of a shooting chance on the display unit 206 as in the case of the second embodiment. As described above, the control unit 301 in the smartphone 300 may determine whether or not to display the notification screen on the display unit 106 in the digital camera 100 or on the display unit 206 in the wearable device 200.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110260, filed Jun. 1, 2016, which is hereby incorporated by reference herein in its entirety.

What is claimed is:

1. A notification system comprising:
a wearable device;
an information processing apparatus connectable to the wearable device; and
an image shooting apparatus connectable to the information processing apparatus,
wherein the information processing apparatus includes:
a first processor; and
a first memory storing a program which, when executed by the first processor, causes the information processing apparatus to:
connect to the wearable device;
acquire position information on a current position of the information processing apparatus; and
transmit a notification request to notify of a shooting chance relating to the position information to the wearable device only if the information processing apparatus is connected to the image shooting apparatus and a shooting subject is found based on the position information, and
wherein the wearable device includes:
a second processor; and
a second memory storing a program which, when executed by the second processor, causes the wearable device to:
connect to the information processing apparatus;
receive the notification request from the information processing apparatus; and
provide notification about the shooting chance according to the received notification request.

2. A wearable device comprising:
a processor; and
a memory storing a program which, when executed by the processor, causes the wearable device to:
connect to an information processing apparatus that is connectable to an image shooting apparatus;
receive a notification request to notify of a shooting chance relating to position information on a current position of the information processing apparatus, from the information processing apparatus, only if the information processing apparatus is connected to the image shooting apparatus and a shooting subject is found based on the position information; and
provide notification about the shooting chance according to the received notification request.

3. The wearable device according to claim 2, wherein the program when executed by the processor further causes the wearable device to stop providing the notification from being performed if the connection with the information processing apparatus is disconnected.

4. The wearable device according to claim 2, wherein the shooting chance is for shooting the shooting subject found based on the position information and the notification is provided depending on whether or not the shooting subject has been shot.

5. The wearable device according to claim 4, wherein the notification is not provided when the shooting subject has been shot.

6. The wearable device according to claim 2, further comprising:
a display unit,
wherein the shooting chance is for shooting the shooting subject found based on the position information and the notification is provided by displaying a name of the shooting subject on the display unit.

7. The wearable device according to claim 2, further comprising:
a display unit,
wherein the shooting chance is for shooting the shooting subject found based on the position information and the notification is provided by displaying a distance to the shooting subject.

8. The wearable device according to claim 2, wherein the notification is provided by making a notification sound.

9. The wearable device according to claim 2, wherein the program, when executed by the processor further causes the wearable device to set a specific shooting subject,
wherein the notification is provided depending on whether or not the shooting subject, which is found based on the position information and is to be shot by the image shooting apparatus at the shooting chance, is the specific shooting subject.

10. The wearable device according to claim 9, wherein the notification is not provided when the shooting subject is the specific shooting subject.

11. An information processing apparatus connectable to an image shooting apparatus comprising:
a processor; and
a memory storing a program which, when executed by the processor, causes the information processing apparatus to:
connect to a wearable device;
acquire position information on a current position of the information processing apparatus; and
transmit a notification request to notify of a shooting chance relating to the position information to the wearable device only if the information processing apparatus is connected to the image shooting apparatus and a shooting subject is found based on the position information.

12. The information processing apparatus according to claim 11, wherein the program when executed by the processor further causes the information processing apparatus to connect to another device through a network; and
acquire information about the shooting subject found based on the position information from the another device,
wherein the notification request is according to information about the shooting subject to be shot by the image shooting apparatus at the shooting chance.

13. The information processing apparatus according to claim 11, wherein the program when executed by the processor further causes the information processing apparatus to:
connect to another device through a network; and
acquire information about the shooting subject found based on the position information from the another device,
wherein the notification request is transmitted to the wearable device when the distance to the shooting subject is within a predetermined range.

14. The information processing apparatus according to claim 11, wherein the shooting chance is for shooting the shooting subject and the notification request is transmitted to the wearable device depending on whether or not the shooting subject has been shot.

15. The information processing apparatus according to claim 11, wherein the notification request is not transmitted to the wearable device when the shooting subject has been shot.

16. The information processing apparatus according to claim 11, wherein the information processing apparatus is connected to the image shooting apparatus through wireless communication.

17. The information processing apparatus according to claim 11, wherein the program, when executed by the processor further causes the information processing apparatus:
to stop transmitting the notification request if the connection with the image shooting apparatus is disconnected.

18. A method of controlling a wearable device, comprising the steps of:
connecting to an information processing apparatus that is connectable to an image shooting apparatus;
receiving a notification request to notify of a shooting chance relating to position information on a current position of the information processing apparatus, from the information processing apparatus, only if the information processing apparatus is connected to the image shooting apparatus and a shooting subject is found based on the position information; and
providing notification about the shooting chance according to the received notification request.

19. A method of controlling an information processing apparatus connectable to an image shooting apparatus, comprising the steps of:
connecting to a wearable device;
acquiring position information on a current position of the information processing apparatus; and
transmitting a notification request to notify of a shooting chance relating to the position information to the wearable device only if the information processing apparatus is connected to the image shooting apparatus and a shooting subject is found based on the position information.

20. A non-transitory computer-readable storage medium storing a program to cause a computer of a wearable device to:
connect to an information processing apparatus that is connectable to an image shooting apparatus;
receive a notification request to notify of a shooting chance relating to position information on a current position of the information processing apparatus, from the information processing apparatus, only if the information processing apparatus is connected to the image shooting apparatus and a shooting subject is found based on the position information; and
provide notification about the shooting chance according to the received notification request.

21. A non-transitory computer-readable storage medium storing a program to cause a computer of an information processing apparatus that is connectable to an image shooting apparatus to:
connect to a wearable device;
acquire position information on a current position of the information processing apparatus; and
transmit a notification request to notify of a shooting chance relating to the position information to the wearable device only if the information processing apparatus is connected to the image shooting apparatus and a shooting subject is found based on the position information.

* * * * *